US012627861B2

(12) United States Patent
Chamaret et al.

(10) Patent No.: US 12,627,861 B2
(45) Date of Patent: May 12, 2026

(54) METHOD OF CONTROLLING ENERGY CONSUMED BY A MULITMEDIA STREAMING APPLICATION

(71) Applicant: INTERDIGITAL MADISON PATENT HOLDINGS, SAS, Paris (FR)

(72) Inventors: Christel Chamaret, Chantepie (FR); Edouard Francois, Bourg des Comptes (FR); Miloš Radosavljevic, Rennes (FR); Erik Reinhard, Hédé-Bazouges (FR); Zoubida Ameur, Cesson-Sevigne (FR); Remi Houdaille, Cesson-Sevigne (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 44 days.

(21) Appl. No.: 18/024,206

(22) PCT Filed: Aug. 16, 2021

(86) PCT No.: PCT/EP2021/072669
§ 371 (c)(1),
(2) Date: Mar. 1, 2023

(87) PCT Pub. No.: WO2022/048889
PCT Pub. Date: Mar. 10, 2022

(65) Prior Publication Data
US 2023/0308719 A1 Sep. 28, 2023

(30) Foreign Application Priority Data

Sep. 1, 2020 (EP) .................................... 20305966
Jun. 24, 2021 (EP) .................................... 21305872

(51) Int. Cl.
| H04N 21/443 | (2011.01) |
| H04N 19/70 | (2014.01) |
| H04N 21/437 | (2011.01) |

(52) U.S. Cl.
CPC ......... *H04N 21/4436* (2013.01); *H04N 19/70* (2014.11); *H04N 21/437* (2013.01)

(58) Field of Classification Search
CPC ... H04N 21/4436; H04N 21/70; H04N 21/437
See application file for complete search history.

(56) References Cited

U.S. PATENT DOCUMENTS

| 8,218,080 B2 | 7/2012 | Xu et al. |
| 9,423,779 B2 | 8/2016 | Agarwal |
(Continued)

OTHER PUBLICATIONS

Anonymous, "Context, Objectives, Use Cases and Requirements for Green MPEG", International Organization for Standardization (ISO), Coding of Moving Pictures and Audio, ISO/IEC JTC1/SC29/WG11, Document: N13468, Incheon, Korea, Apr. 2013, 7 pages.
(Continued)

*Primary Examiner* — Joshua D Taylor
(74) *Attorney, Agent, or Firm* — Condo Roccia Koptiw LLP

(57) ABSTRACT

A method of controlling energy consumed by a multimedia streaming application executed in a multimedia streaming system, the method comprising: receiving (358), at an end-user device, a message including information representative of energy consumed by at least one node of the multimedia streaming system when applying at least one process on content having a first profile delivered by the multimedia streaming application prior to delivering the content having the first profile to the end-user device; and requesting (359), at the end-user device, content having a second profile based on the received information representative of the energy consumed by the at least one node.

16 Claims, 7 Drawing Sheets

(56) References Cited

U.S. PATENT DOCUMENTS

| | | | | |
|---|---|---|---|---|
| 2006/0146184 | A1* | 7/2006 | Gillard | H04L 47/38 |
| | | | | 348/397.1 |
| 2010/0111488 | A1 | 5/2010 | Chia-Chen | |
| 2014/0095670 | A1* | 4/2014 | Ozgur | H04W 48/20 |
| | | | | 709/219 |
| 2014/0376618 | A1* | 12/2014 | Ma | H04N 19/46 |
| | | | | 375/240.03 |
| 2015/0326887 | A1* | 11/2015 | Ducloux | H04N 19/156 |
| | | | | 375/240.02 |
| 2016/0112953 | A1* | 4/2016 | Go | H04L 65/65 |
| | | | | 370/329 |
| 2016/0234549 | A1* | 8/2016 | Ducloux | H04N 21/4424 |
| 2017/0223601 | A1* | 8/2017 | Egner | A61B 5/14532 |
| 2018/0241650 | A1* | 8/2018 | Fersman | H04L 43/04 |
| 2020/0274909 | A1 | 8/2020 | Kim et al. | |
| 2020/0403991 | A1* | 12/2020 | Sohail | H04L 63/1433 |
| 2021/0288942 | A1* | 9/2021 | Preda | H04L 65/612 |

OTHER PUBLICATIONS

Horowitz et al., "The secret costs of manufacturers exploiting loopholes in the government's TV energy test", The Natural Resources Defence Council (NRDC), Document: R-16-09-B, Sep. 2016, 36 pages.
Wang et al., "Multi-Scale Structural Similarity for Image Quality Assessment", The Thirty-Seventh Asilomar Conference on Signals, Systems & Computers (ACSSC) Conference, Pacific Grove, California, USA, Nov. 9, 2003, 5 pages.
Pilarska et al., "Convince D1.2.3 Business Case IPTV and OTT with NGPOP solution", Celtic-Plus Smart Connected World, CONVINcE project public document, Aug. 2017, 24 pages.
Khan et al., "RAPL in Action: Experiences in Using RAPL for Power Measurements", ACM Transactions on Modeling and Performance Evaluation of Computing Systems , vol. 3, No. 2 , Jan. 2018, 27 pages.
Anonymous, "Information Technology—MPEG Systems Technologies—Part 11: Energy-Efficient Media Consumption (Green Metadata)", International Standarisation Organisation ISO/IEC 1/SC 29, Draft International Standard ISO/IEC SoDIS 23001-11, Apr. 26, 2013, 54 pages.
Maxime Efoui-Hess, "Climat: L'insoutenable usage de la video en ligne", The Shift Project: The Carbon Transition Think Tank, Jul. 2019, 36 pages.

Sanchez et al., "Low Complexity Cloud-video-Mixing Using HEVC", Institute of Electronics and Electrical Engineers (IEEE), 2014 IEEE 11th Consumer Communications and Networking Conference (CCNC), Las Vegas, Nevada, USA, Jan. 10, 2014, 6 pages.
Fernandes et al., "Requirements on Green MPEG", International Organization for Standardization (ISO), Coding of Moving Pictures and Audio, ISO/IEC JTC1/SC29/WG11, Document: N13221, Shanghai, China, Oct. 2012, 4 pages.
Sjoberg et al., "Overview of HEVC High-Level Syntax and Reference Picture Management", Institute of Electronics and Electrical Engineers (IEEE), IEEE Transactions on Circuits and Systems for Video Technology, vol. 22, No. 12, Dec. 2012, 13 pages.
Li et al., "Toward A Practical Perceptual Video Quality Metric", Netflix Technology Blog, Jun. 6, 2016, 23 pages.
Uitto M, "Energy consumption evaluation of H.264 and HEVC video encoders in high-resolution live streaming", Institute of Electronics and Electrical Engineers (IEEE), 12th IEEE International Conference on Wireless and Mobile Computing, Networking and Communications (WiMob), New York, New York, USA, Oct. 2016, 7 pages.
Anonymous, "Greening video distribution networks: Energy-Efficient Internet Video Delivery", Springer International Publishing AG, Computer Communications and Networks, 2018, 236 pages.
Labasan et al., "Intel Running Average Power Limit Technology", University of the Pacific & Lawrence Livermore National Laboratory, Document: LLNL-POST-599036, May 22, 2014, 1 page.
Anonymous, "Information Technology—Coding of Audio-Visual Objects—Part 10: Advanced Video Coding", International Standard, ISO/IEC 14496-10, Second Edition, Oct. 1, 2004, 280 pages.
ITU-T, "High Efficiency Video Coding", Recommendation ITU-T H.265, Series H: Audiovisual and Multimedia Systems, Infrastructure of Audiovisual Services—Coding of Moving Video, Feb. 2018, 692 pages.
Kränzler, et al., "Decoding Energy Assessment of VTM-6.0", Document: JVET-P0084, Multimedia Communications and Signal Processing, Friedrich-Alexander Universität Erlangen-Nürnberg (FAU), Joint Video Experts Team (JVET) of ITU-T SG 16 WP 3 and ISO/IEC JTC 1/SC 29/WG 11 16th Meeting: Geneva, CH, Oct. 2019, 9 pages.
Scholand, et al., "Measurement Of Automatic Brightness Control In Televisions—Critical For Effective Policy-making", ECEEE Summer Study proceedings, 2017, 8 pages.

* cited by examiner

METHOD OF CONTROLLING ENERGY CONSUMED BY A MULITMEDIA STREAMING APPLICATION

CROSS REFERENCE TO RELATED APPLICATIONS

This application is a U.S. National Stage Application under 35 U.S.C. § 371 of International Patent Application No. PCT/EP2021/072669, filed Aug. 16, 2021, which is incorporated herein by reference.

This application claims priority to European Patent Application Nos. (i) 20305966.2, filed Sep. 1, 2020, and (ii) 21305872.0, filed Jun. 24, 2021; each of which is incorporated herein by reference in its entirety.

1. TECHNICAL FIELD

At least one of the present embodiments generally relates to a method, apparatuses and a system for collecting information representative of an energy consumed by a multimedia streaming application and a method, apparatuses and systems using the collected information to control an energy consumed by a multimedia streaming application.

2. BACKGROUND

Reducing our energy consumption is a major issue. This issue concerns many fields and in particular the field of electronic systems. The last few years have seen the emergence of multimedia streaming applications to such an extent that this type of applications now represents a significant part of the overall consumption of electrical energy.

A recent initiative of the MPEG community can be considered as a preliminary tentative of investigating the subject of the energy consumed by multimedia streaming applications. This initiative released metadata related to the reduction of energy consumption in video codecs (encoder, decoder and display) while preserving acceptable video quality. No specific changes have been made to codecs architecture. MPEG standardized two ways of transporting this metadata: by SEI (Supplemental Enhancement Information) messages embedded in the video stream and embedded in a MPEG2 Transport stream. Encoder complexity and consumption can be reduced by alternating low-and high-quality segments in a video stream, requiring less energy use (less modes, less exhaustive search . . . ). At the decoder, the energy consumption is decreased by piloting a CPU frequency of the decoding device. More details can be found in the document ISO/IEC JTC1/SC29/WG11 N13468, *"Context, Objectives, Use Cases and Requirements for Green MPEG"*, April 2013, Incheon, Korea.

As can be seen, green MPEG concentrates mainly on the codecs which is only a sub-part of all devices involved in multimedia streaming applications, called the multimedia streaming chain in the following. As a consequence, green MPEG allows controlling only an energy consumed by said sub-part and not by the complete multimedia streaming chain.

A key aspect to be able to control efficiently the energy consumed by a multimedia streaming application is to obtain information representing the energy actually consumed by said application. However, while it is relatively easy to obtain information on the energy consumed by the codec, no standard tool allows obtaining information on the energy consumed by the rest of the multimedia streaming chain.

Hence, an end-user does not have the means to really assess and control the multimedia streaming application energy consumption.

Any solution allowing an end user obtaining information on the energy consumed by its multimedia streaming application is therefore welcome. This information would allow for example the end user being more responsible and actor of its own energy consumption and implementing strategies to reduce this energy consumption.

It is desirable to propose solutions providing information on the energy consumed by a complete multimedia streaming chain.

3. BRIEF SUMMARY

In a first aspect, one or more of the present embodiments provide a method of controlling energy consumed by a multimedia streaming application executed in a multimedia streaming system, the method comprising:

> receiving, at an end-user device, a message including information representative of energy consumed by at least one node of the multimedia streaming system when applying at least one process on content having a first profile delivered by the multimedia streaming application prior to delivering the content having the first profile to the end-user device; and > requesting, at the end-user device, content having a second profile based on the received information representative of the energy consumed by the at least one node.

In an embodiment, the method comprises displaying, at an end-user device, energy modes representative of different profiles of the content; wherein the content having the second profile is further requested based on a energy mode selected from among the displayed energy modes.

In a second aspect, one or more of the present embodiments provide a method of controlling energy consumed by a multimedia streaming application for streaming data executed in a multimedia streaming system, said method comprising:

> determining, at a node of the multimedia streaming system, a first energy consumed by said node when applying at least one first process on said data;

> obtaining, at said node, a message intended to transport information representative of the energy consumed by the multimedia streaming application;

> inserting an information representative of the first energy in said message; and, > modifying the energy consumed by said multimedia streaming application based at least on the information representative of the first energy comprised in said message.

In an embodiment, the message is transmitted to at least one next node of the system involved in the multimedia streaming application.

In an embodiment, the message is generated by the node or received from a prior node of the multimedia streaming system involved in the multimedia streaming application, the received message comprising information representative of a second energy consumed by the prior node when applying at least one second process on said data.

In an embodiment, the message is embedded in at least one bitstream comprised in said data or inserted in an independent bitstream.

In an embodiment, the data is an original bitstream representative of a multimedia content or at least one bitstream representative of a profile of the multimedia content obtained from the original bitstream or from the multimedia content.

In an embodiment, the at least one first process comprises receiving the original bitstream or the at least one bitstream from a prior node and/or distributing the at least one bitstream to at least one next node and/or transcoding the original bitstream into the at least one bitstream and/or decoding the original bitstream and encoding the decoded original bitstream in the at least one bitstream and/or multiplexing the at least one bitstream and/or routing the at least one bitstream.

In an embodiment, the information representative of the first energy further comprises a first syntax element specifying a type of the streaming between a one to one streaming and a one to many streaming.

In an embodiment, the first syntax element specifies a one-to-many streaming, the information representative of the first energy further comprises a second syntax element specifying a number of next nodes to which the data is distributed by the node.

In an embodiment, the information representative of the first energy further comprises at least one third syntax element, each third syntax element specifying a type of process applied by the node.

In an embodiment, the node estimates an energy consumed by a preceding node unable to manage a message intended to transport information representative of the energy consumed by the multimedia streaming application and inserts an information representative of said estimated energy in the message it has obtained.

In a third aspect, one or more of the present embodiments provide a method of controlling an energy consumed by a multimedia streaming application executed in a multimedia streaming system, wherein the method comprises, when executed in a node of said system, receiving data representative of a multimedia content, receiving a message generated by the method according to the second aspect, and, modifying a characteristic of the data representative of the multimedia content involved in the energy consumed by the multimedia streaming system in function of information contained in the message.

In a fourth aspect, one or more of the present embodiments provide a device for controlling energy consumed by a multimedia streaming application executed in a multimedia streaming system, the device comprising electronic circuitry configured for:

receiving a message including information representative of energy consumed by at least one node of the multimedia streaming system when applying at least one process on content having a first profile delivered by the multimedia streaming application prior to delivering the content having the first profile to the device; and requesting content having a second profile based on the received information representative of the energy consumed by the at least one node.

In an embodiment, the electronic circuitry is further configured for displaying energy modes representative of different profiles of the content; the content having the second profile being further requested based on a selected energy mode selected from among the displayed energy modes.

In a fifth aspect, one or more of the present embodiments provide a node of a multimedia streaming system executing a multimedia streaming application for streaming data, the node comprising electronic circuitry configured for:

determining a first energy consumed by said node when applying at least one first process on said data;

obtaining a message intended to transport information representative of the energy consumed by the multimedia streaming application;

inserting an information representative of the first energy in said message; and, modifying the energy consumed by said multimedia streaming application based at least on the information representative of the first energy comprised in said message.

In an embodiment, the electronic circuitry is further configured to transmit the message to at least one next node of the multimedia streaming system involved in the multimedia streaming application.

In an embodiment, the electronic circuitry is further configured to generate the message or to receive the message from a prior node of the multimedia streaming system involved in the multimedia streaming application, the received message comprising information representative of a second energy consumed by the prior node when applying at least one second process on said data.

In an embodiment, the message is embedded in at least one bitstream comprised in said data or inserted in an independent bitstream.

In an embodiment, the data is an original bitstream representative of a multimedia content or at least one bitstream representative of a profile of the multimedia content obtained from the original bitstream or from the multimedia content.

In an embodiment, the at least one first process comprises receiving the original bitstream or the at least one bitstream from a prior node and/or distributing the at least one bitstream to at least one next node and/or transcoding the original bitstream into the at least one bitstream and/or decoding the original bitstream and encoding the decoded original bitstream in the at least one bitstream and/or multiplexing the at least one bitstream and/or routing the at least one bitstream.

In an embodiment, the information representative of the first energy further comprises a first syntax element specifying a type of the streaming between a one to one streaming and a one to many streaming.

In an embodiment, the first syntax element specifies a one-to-many streaming, the information representative of the first energy further comprises a second syntax element specifying a number of next nodes to which the data is distributed by the node.

In an embodiment, the information representative of the first energy further comprises at least one third syntax element, each third syntax element specifying a type of process applied by the intermediate node.

In an embodiment, the electronic circuitry is further configured to estimate an energy consumed by a preceding node unable to manage a message intended to transport information representative of the energy consumed by the multimedia streaming application and to insert an information representative of said estimated energy in the message obtained by the node.

In a sixth aspect, one or more of the present embodiments provide a node of a multimedia streaming system executing a multimedia streaming application for streaming data representative of a multimedia content, comprising electronic circuit configured for: receiving data representative of a multimedia content, receiving a message obtained by the node of the fifth aspect, and, modifying a characteristic of the data representative of the multimedia content involved in the energy consumed by the multimedia streaming system in function of information contained in the message.

In a seventh aspect, one or more of the present embodiments provide a method of controlling energy consumed by a multimedia streaming application executed in a multimedia streaming system, the method comprising:

receiving, at an end device, for a reference representation of a content and for at least one additional representation of the content, a message comprising information representative of an energy consumed by at least one node of the multimedia streaming system for applying at least one process on the representation prior to delivering the representation to the end device and information representative of a quality of the representation; and, requesting, at the end device, a representation selected among the reference representation and the at least one additional representation based on the received information.

In an embodiment, the message is a SEI message or a manifest file.

In an embodiment, the message further comprises an information representative of a resolution of the representation and/or an information representative of a bitrate of the representation.

In an embodiment, the message is generated by one node of the multimedia streaming system.

In an embodiment, the message is updated by at least one other node of the multimedia streaming system.

In an embodiment, the information representative of an energy consumed by at least one node of the multimedia streaming system for applying at least one process on a representation prior to delivering the representation to the end device are obtained using energy consumption models.

In a eighth aspect, one or more of the present embodiments provide a device for controlling energy consumed by a multimedia streaming application executed in a multimedia streaming system, the device comprising:

means for receiving, at an end device, for a reference representation of a content and for at least one additional representation of the content, a message comprising information representative of an energy consumed by at least one node of the multimedia streaming system for applying at least one process on the representation prior to delivering the representation to the end device and information representative of a quality of the representation; and, means for requesting, at the end device, a representation selected among the reference representation and the at least one additional representation based on the received information.

In an embodiment, the message is a SEI message or a manifest file.

In an embodiment, the message further comprises an information representative of a resolution of the representation and/or an information representative of a bitrate of the representation.

In an embodiment, the message is generated by one node of the multimedia streaming system.

In an embodiment, the message is updated by at least one other node of the multimedia streaming system.

In an embodiment, the information representative of an energy consumed by at least one node of the multimedia streaming system for applying at least one process on a representation prior to delivering the representation to the end device are obtained using energy consumption models.

In a ninth aspect, one or more of the present embodiments provide a computer program comprising program code instructions for implementing the method according to the first, the second, or the seventh aspect.

In a tenth aspect, one or more of the present embodiments provide a non-transitory information storage means storing program code instructions for implementing the method according to the first, the second or the seventh aspect.

4. BRIEF SUMMARY OF THE DRAWINGS

FIG. 1 schematically represents a context in which various embodiments can be implemented;

5. DETAILED DESCRIPTION

The energy consumed by a multimedia streaming application is related to several aspects and processes, from its production to its use, via its distribution and transmission. There is an energy cost to create, to encode, to packetize, to distribute, to transmit and to decode the video in addition to those of rendering the content on display devices. In the following, embodiments are described in the context of multimedia streaming applications. However, these embodiments can be generalized to other types of data distribution applications such as for example network based games.

Figure 1:
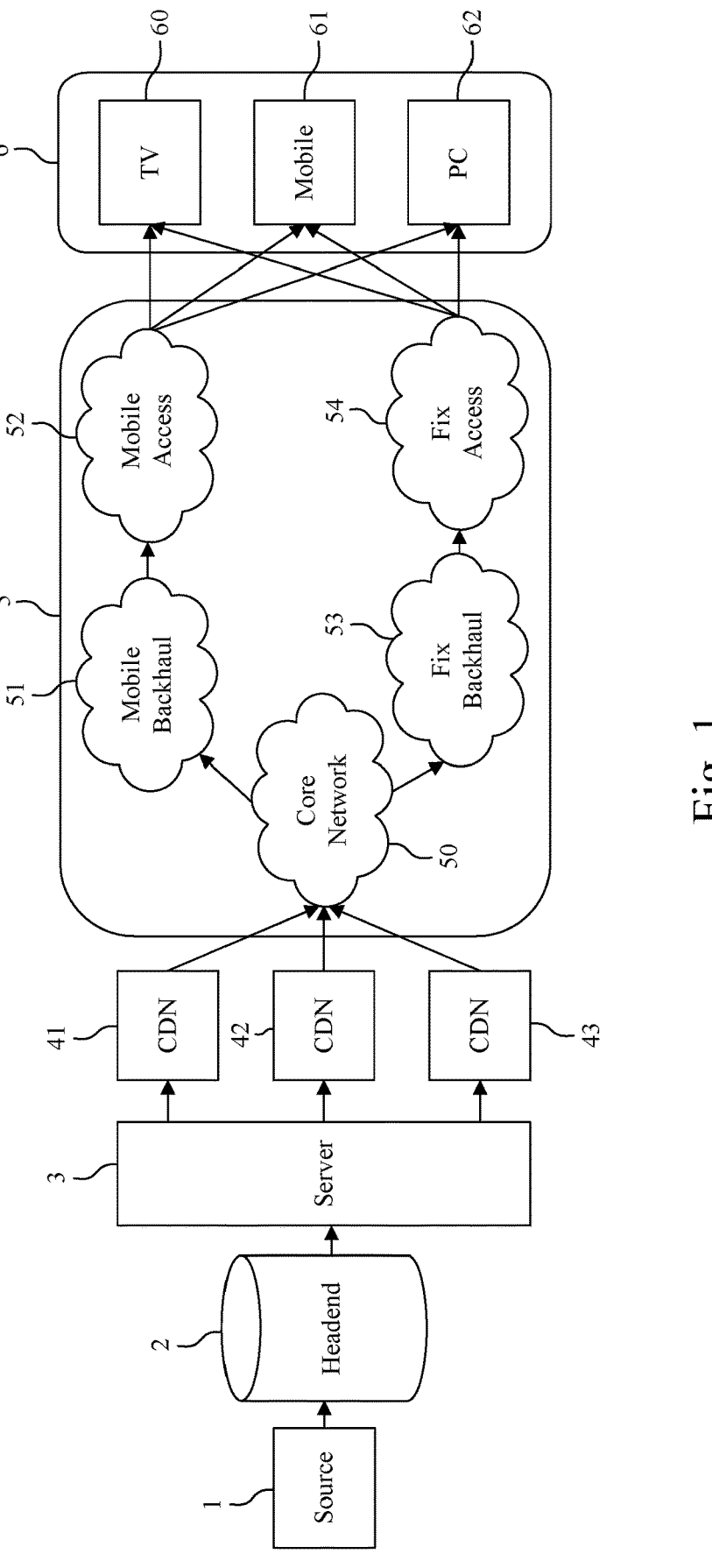

FIG. 1 schematically represents a context in which various embodiments can be implemented.

In FIG. 1, we take an example of an OTT (Over The Top) service. An OTT service is a streaming media service offered directly to viewers via the Internet. OTT bypasses cable, broadcast, and satellite television platforms, the companies that traditionally act as a controller or distributor of such content. The term is most synonymous with subscription-based video-on-demand (SVoD) services that offer access to film and television contents.

However, the following embodiments are not restricted to the OTT service and can be extended to other type of service such as IPTV (Internet Protocol Television). IPTV corresponds to a delivery of television content over Internet Protocol (IP) based networks. This is in contrast to delivery through traditional terrestrial, satellite, and cable television formats. Unlike downloaded media, IPTV offers the ability to stream source media continuously. As a result, a client media player can begin playing the content (such as a TV channel) almost immediately.

As a majority of multimedia streaming applications, the OTT service of FIG. 1 is based on an HTTP ("HyperText Transfer Protocol", RFC 2616) based protocol. HTTP-based streaming technologies are very convenient, as HTTP allows going through firewalls and guarantees data integrity by relying on TCP ("Transmission Control Protocol", RFC 793). Various HTTP based protocols have been developed recently: Apple HLS (HTTP Live Streaming), Microsoft Smooth Streaming (MSS), Adobe HTTP Dynamic Streaming (HDS), MPEG Dynamic Adaptive Streaming over HTTP (MPEG-DASH). These protocols are based on the concept of HTTP Adaptive Streaming (HAS). A streaming based on the HAS concept relies on the following characteristics:

Each multimedia content is encoded in the form of a bitstreams in a plurality of profiles using different codecs, different resolutions, different bitrates and different frame rates. This plurality of profiles allows addressing a large variety of end devices (or of applications executed by end devices) having different capacities (supported codecs, display resolutions, computation capacities) and to adapt the video content to bandwidth variations.

Each bitstream is divided in segments, called chunks, representing few seconds of a multimedia content. For each multimedia content, a file, called manifest, providing a description of each profile and of the associated chunks, is created.

The manifests and the corresponding chunks are stored on servers of a Content Delivery Network (CDN). The CDNs provide caching capacities in a network allowing improving the QoS (Quality Of Service) of streaming applications, in particular in terms of access time and latency. a CDN is constituted of computers interconnected by the Internet and cooperating to deliver multimedia contents to users. More precisely, a CDN is constituted of original servers from which contents are injected in the CDNs for replication, peripheral servers geographically spread over the network in which the contents of the original servers are replicated, and routing mechanisms allowing a user request for a content to be computed by the closest server.

An end device wishing playing a multimedia content, sends an HTTP request to a CDN to receive a manifest and then, based on the received manifest, request chunks (using HTTP requests) corresponding to a selected profile of said multimedia content. There is an HTTP request for each chunk, the end device being therefore able to modify the profile for each chunk.

In the example of the OTT service of FIG. 1, the streaming is for example based on the HLS (HTTP Live Streaming) protocol.

FIG. 1 represents a system comprising:
A source 1;
An OTT headend, called headend in the following, 2;
An original server, called server in the following, 3;
CDNs 41, 42 and 43;
A network 5 comprising an IP based core network 50, a mobile backhaul 51 and a fix backhaul 53, a wireless access 52 and a wired access 54;

End devices 6 such as a TV 60, a mobile device (a smartphone, a tablet, etc) 61 and a computer such as a PC 62.

The source 1 provides an original multimedia content to the headend 2. In the example of FIG. 1, the multimedia content is encoded in an original bitstream. The original bitstream comprises at least a video sub-stream encoded in a first format. The first format is for example compliant with the emerging standard entitled Versatile Video Coding (VVC) under development by a joint collaborative team of ITU-T and ISO/IEC experts known as the Joint Video Experts Team (JVET), the standard HEVC (ISO/IEC 23008-2—MPEG-H Part 2, High Efficiency Video Coding/ITU-T H.265, the standard AVC (Advanced Video Coding (ITU-T H.264/ISO/IEC MPEG-4 Part 10 (ISO/IEC 14496-10)), the standard EVC (Essential Video Coding/MPEG-5) or the standard AV1.

The headend 2 is in charge of preparing the original multimedia content so that it is compliant with needs of end devices than can request this multimedia content. The headend 2 comprises a plurality of hardware and/or software modules. These modules can be colocalized in a same system or disseminated in independent systems connected within each other by a communication network. The different modules can implement for example a transcoder. This transcoder comprises for example a decoder for decoding the original bitstream, a processing module applying various treatments to the decoded bitstream, and encoding module encoding the output(s) of the processing module at various bitrates in various formats and a packetizer creating chunks embedding the outputs of the encoding module. The various treatments applied by the processing module comprise for example a temporal and or spatial sub-sampling and/or an up-sampling of the images of the video sub-stream to create video sub-streams with various spatial and temporal resolutions. The various formats are for example VVC, HEVC, AVC, EVC and AV1. The plurality of sub-streams corresponding to all profiles can be multiplexed in one transport stream. The headend 2 then transmits the chunks to the server 3 with associated manifest describing each profile of the multimedia content.

The server 3 transmits the chunks and the manifest to CDN 41, 42 and 43 for replication.

An end device 60, 61 or 62 wishing to play the multimedia content, sends an HTTP request to request the manifest to one CDN 41, 42 or 43 via the network 5. Upon reception of the manifest, the end device requests the multimedia content chunk by chunk, each chunk corresponding to a profile selected dynamically by the end device.

As can be seen, the system of FIG. 1 comprises various components that can be implemented in hardware or software. The various components may act in different layers of the OSI (Open Systems Interconnection) model. For instance, the source 1, the headend 2 and the end devices 6 act in all layers of the OSI model from the physical layer to transmit the data to the application layer for the generation and/or the management of said data. The components of the network 5 generally act only in layers from the physical layer to the transport layer. As seen above, the CDNs are groups of components comprising replicating servers and interconnection device such as routers interconnecting the replicating servers. While the replicating servers implement all OSI layers, the interconnection devices implement only layers from the physical layer to the transport layer.

Storing multiple profiles of a multimedia content in CDNs represents a huge amount of data. To reduce the amount of data stored by the CDNs, it is also possible to perform a part of the transcoding task in the CDNs. In that case, the headend 2 only prepares bitstreams for a reduced set of possible profiles. Only these bitstreams are then stored by the CDNs. Then, when an end device requests to a CDN a profile that doesn't correspond to the profiles considered by the headend, the CDN transcodes on the fly one of the bitstreams it has stored into a bitstream compliant with the requested profile.

As can be seen, the diversity of multimedia streaming solutions and of components of a multimedia streaming system make the modelling or measure of the energy consumption difficult along the multimedia streaming chain.

Figures 2A, 2B:
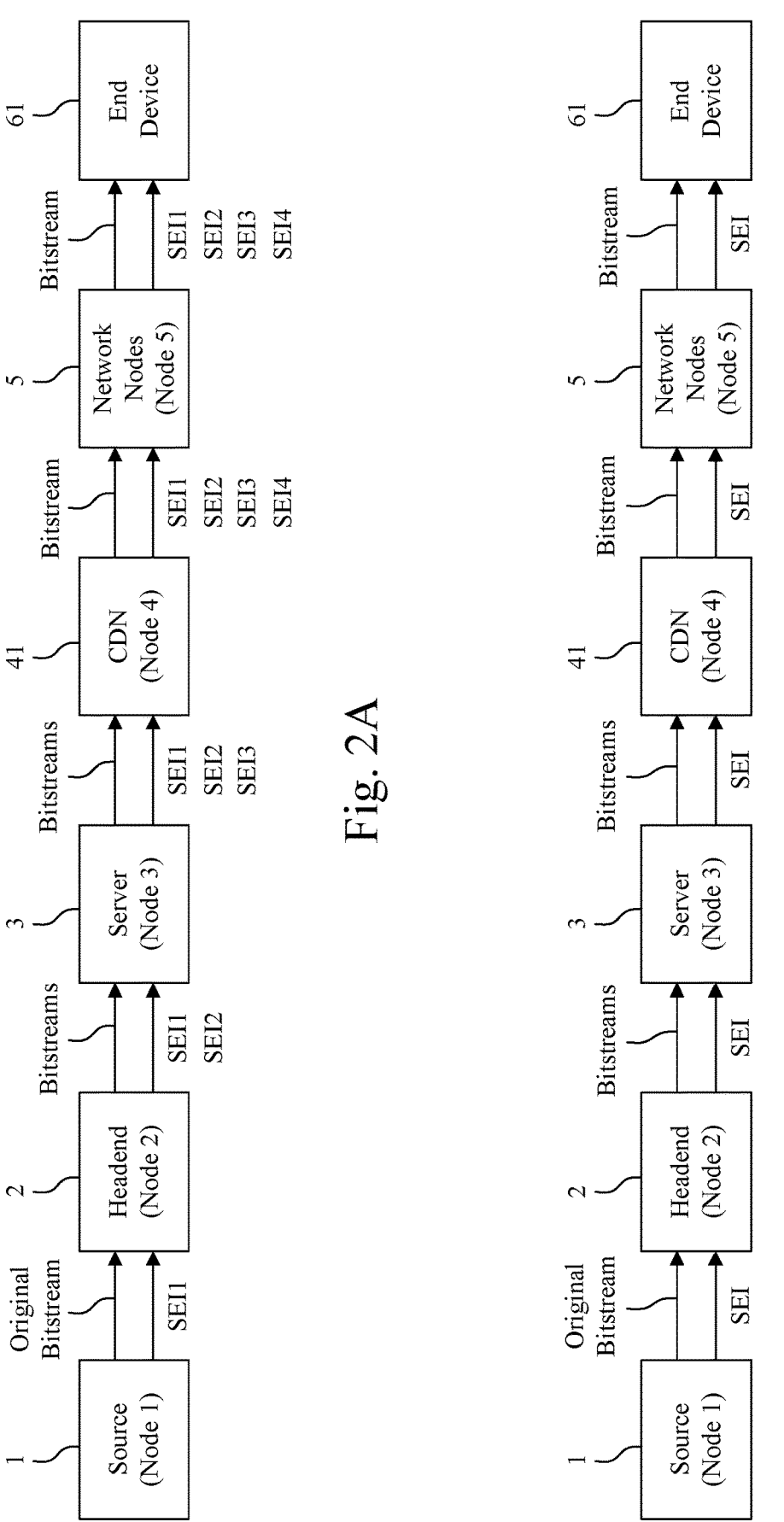
FIG. 2A represents a first embodiment of a solution allowing collecting energy consumption information all along a multimedia streaming chain.
FIG. 2B represents a second embodiment of a solution allowing collecting energy consumption information all along a multimedia streaming chain.

FIG. 2A represents a first embodiment of a solution allowing collecting energy consumption information all along a multimedia streaming chain.

The embodiment of FIG. 2A is executed in the OTT system of FIG. 1. Only the components (called nodes in the following) of the OTT system of FIG. 1 involved in a streaming of a multimedia content to the end device 61 are represented.

Before any request of the terminal 61, a communication has been established between the source 1 and the CDN 41, via the headend 2 and the server 3 to store chunks and a manifest file corresponding to different profiles of the multimedia content. In case of on-demand video, the chunks stored by the CDN 41 may correspond to the complete multimedia content. In case of a live video, the chunks correspond to few seconds of the multimedia content regularly captured and updated by the source 1.

The storage of the chunks on the CDN 41 and the streaming from the CDN 41 to the end device 61 corresponds to two asynchronous phases. In other words, these phases are independent, with the only constraint that the chunks storage phase must ensure that a sufficient amount of chunks are available in the CDN 41 to ensure a smooth streaming.

In a first embodiment represented in FIG. 2A, each node except the end device 61 generates at least one SEI (supplemental Enhancement Information) message. A SEI message is a data container transporting metadata describing the data comprised in a bitstream to which is associated said SEI message. SEI messages were defined in standards such as for example AVC, HEVC, VCC. Each SEI message generated by a node comprises information representative of an energy consumed by said node when processing a bitstream. The processing comprises all treatments applied by said node to generate and/or to receive and/or to forward a bitstream and/or to apply a treatment on the multimedia content represented by said bitstream. Once generated, the SEI message is concatenated to the corresponding bitstream. All SEI messages are then collected by the end device 61. The end device 61 then decodes these SEI messages and can use the contained information to assess the energy consumed by the multimedia streaming application.

For example, the source 1 generates an original bitstream corresponding to a multimedia content such as a video and a SEI message SEI1 comprising metadata representing an energy consumed by the source 1 to generate and transmit the original bitstream to the headend 2. The SEI message SEI1 is embedded to the original bitstream.

The headend 2 generates a plurality of bitstreams from the original bitstream, each bitstream corresponding to a different profile. A SEI message SEI2i is generated for each bitstream i. Said SEI message SEI2i represents the energy consumed by the headend 2 to generate the bitstream i from the original bitstream and for transmitting the bitstream i to the CDN 41. The headend 2 extracts the SEI message SEI1 from the original bitstream and embeds the SEI message SEI1 and the SEI message SEI2i to each bitstream.

The server 3 generates a SEI message SEI3i for each bitstream i it receives. Each SEI message SEI3i represents the energy consumed by the server 3 to receive and forward the bitstream i to the CDN 41. Each SEI message SEI3i is concatenated to the corresponding bitstream i.

The CDN 41 generates a SEI message SEI4i for each bitstream i it receives. Each SEI message SEI4i represents the energy consumed by the CDN 41 to receive and store each bitstream i. Each SEI message SEI4i is concatenated to the corresponding bitstream i.

Upon reception of a request for a profile corresponding to a bitstream i by the end device 61, the CDN 41 generates a SEI message SEI4i'. The SEI message SEI4i' comprises an information representative of the energy consumed by the CDN 41 for forwarding the chunks of the bitstream i corresponding to the requested profile to the end device 61. The SEI message SEI4i' is embedded in the bitstream i corresponding to the requested profile. Note that, if a transcoding was applied by the CDN 41 to generate a bitstream corresponding to the requested profile, a part of the information representative of the energy consumed by the CDN 41 represents the energy consumed for the transcoding.

The network nodes of the network 5 involved in the transmission of the chunks of the bitstream i corresponding to the selected profile are unable to manipulate SEI messages. Indeed, these network nodes do not implement the application layer of the OSI model wherein the SEI messages are managed. In a variant of the first embodiment, these network nodes are not taken into account in the computation of the energy consumed by the multimedia streaming application. In this variant of the first embodiment, the only role of these network nodes of the network 5 is to forward the bitstream i comprising the SEI message SEI1 and the SEI messages SEI2i, SEI3i, SEI4i and SEI4i' corresponding to the bitstream i to the end device 61.

Then, as said earlier, the end device 61 collects all SEI messages embedded in the bitstream i. In a variant of the first embodiment, the end device 61 adds the energy it consumes to the energy collected thanks to the SEI messages to obtain an energy information representative of the energy consumed by the complete multimedia streaming chain.

In the above description of the FIG. 2A, it is supposed that the end device selects a profile and keeps this selected profile all along a multimedia streaming session. Indeed, only the SEI messages SEI2i, SEI3i, SEI4i embedded in the bitstream i corresponding to the profile selected by the end device 61 are received by the end device 61. In addition, it is supposed that the energy consumed by the nodes involved in the streaming of the selected profile to the end device 61 is steady all along the multimedia streaming session. With such assumptions, it may be justified to provide to the end device 61 only energy information representing exclusively the energy consumed by the multimedia streaming chain to stream chunks of the bitstream i corresponding to the selected profile only one time during the multimedia streaming session. In that case, the CDN 41 embeds the SEI messages SEI1, SEI2i, SEI3i, SEI4i and SEI4i' in bitstream i only one time during the multimedia streaming session.

However, the energy consumed to generate the bitstream i may not be steady during a complete multimedia streaming session. Indeed, the complexity of the multimedia content may change during the multimedia streaming session. Therefore, the energy consumed to stream this multimedia content vary all along the multimedia session. In a variant of the first embodiment, the multimedia content is divided in periods and each node 1, 2, 3 and 41 generates new SEI messages for each period. For instance, each node 1, 2, 3 and 41 generates respectively SEI message SEI1, SEI2*i*, SEI3*i* and SEI4*i* for each period of one second of the multimedia content. Then, when chunks corresponding to a period of the multimedia content are requested by the end device 61, only SEI messages SEI1, SEI2*i*, SEI3*i* and SEI4*i* corresponding to said period are sent to the end device 61. The energy information collected by the end device 61 corresponds to the period of the multimedia content it is currently playing.

In addition, in a real multimedia streaming application, due at least to the adaptation to the varying network conditions, an end device requests different profiles during a multimedia streaming session. In a variant of the first embodiment, each time the end device 61 requests a profile it has never requested before for the multimedia content, the CDN41 embeds at least one time the SEI messages SEI1, SEI2*i*, SEI3*i*, SEI4*i* and SEI4*i*' in the bitstream i corresponding to the newly requested profile.

When SEI messages are embedded per period, in a first variant, only the SEI messages SEI1, SEI2*i*, SEI3*i*, SEI4*i* and SEI4*i*' of the bitstream i corresponding to the profile requested for the current period are embedded in the bitstream i.

In a second variant, SEI messages corresponding to the current period and to all profiles requested for the multimedia content since the start of the multimedia streaming session comprising the profile requested for the current period are embedded in the bitstream i. For example, if a profile i corresponding to a bitstream i is requested for the current period and a profile j corresponding to a bitstream j is the only profile requested before the current period, SEI messages SEI1, SEI2*i*, SEI3*i*, SEI4*i* and SEI4*i*' and SEI2*j*, SEI3*j*, SEI4*j* are embedded in the bitstream i for the current period. Here, it is considered that, in order to allow the end device 61 switching between the profiles i and j to adapt to the network conditions, the streaming of the multimedia content to the end device implies that chunks corresponding at least to the profile i and j must be stored in the CDN 41. Consequently, all processes allowing storing the chunks corresponding to profiles i and j in CDN 41 are taken into account and the end device 61 receives energy information corresponding to these two profiles.

In a variant of the first embodiment, it is considered that, even if for its multimedia streaming session, the end device 61 uses only a subset of the profiles generated for the multimedia content, the multimedia streaming session requires storing in the CDN 41 chunks for all the generated profiles. In that case, the headend 2 generates only one SEI message (or one SEI message per period) SEI2 comprising information representative of the energy consumed for generating all profiles. The SEI message SEI2 can be viewed as a concatenation of the SEI messages SEI2*i* of the previous variants of the first embodiment. Similarly, the server 3 and the CDN 41 generates respectively only one SEI message SEI3 and SEI4 for all profiles instead of a SEI message SEI3*i* and SEI4*i* for each profile. To avoid multiple transmissions of a same SEI message, the SEI message SEI2 and SEI3 are either embedded in only one of the bitstreams i or transmitted in an independent bitstream.

As mentioned earlier, some nodes involved in a multimedia streaming session are unable to manipulate SEI messages. These nodes, called unaware nodes in the following by opposition to aware nodes that are capable of manipulating SEI messages, corresponds for example to network nodes of the network 5 but also to some routing nodes inside the CDNs. In a variant of the first embodiment, it is considered that the energy consumed by unaware nodes during a multimedia streaming session is not insignificant. In this variant of the first embodiment, an estimation of the energy consumed by unaware nodes located between two aware nodes is computed by the aware node following these unaware nodes in the multimedia streaming chain. The estimation can be based on an amount of unaware nodes located between the previous aware node having generated a SEI message and the current aware node. To do so, the previous aware node can store a value of a TTL (Time To Live) field of the IP (internet protocol: RFC 791) header of a packet transporting a SEI message in said SEI message. Since, the TTL is decremented of one unit by each router crossed by a packet, the current aware node can estimates the amount of routers crossed by a packet transporting a SEI message since the last aware node by comparing the value of the TTL of said packet to the TTL stored in the SEI message it transports. In a first approximation, the amount of routers can be considered as corresponding to the amount of unaware nodes between two aware nodes. The amount of unaware nodes can then be multiplied by a value representative of an energy consumed by an unaware node to process a bitstream. The value representative of an energy consumed by an unaware node to process a bitstream can be for example an average energy, such as an average energy per streamed bit multiplied by an amount of bits of the bitstream to which correspond the SEI message. In the example of FIG. 2A, the value representative of the energy consumed by the network nodes of the network 6 is computed by the end device 61. Concerning CDN, for simplification, we consider in the following that a CDN (for example, the CDN 41) is constituted of at least one router and one replication server, the at least one router allowing routing the chunks to the replication server. In that case, each router is an unaware node and the replication server is an aware node. The value representative of the energy consumed by the unaware nodes of the CDN 41 is therefore computed by the replication server of the CDN 41.

Until now, in the first embodiment, it is generally considered that the information representative of the energy consumption are contained in SEI messages embedded in bitstreams. Alternatively, instead of using the SEI message mechanism, the information representative of the energy consumption can also be distributed via transport mechanisms such as MPEG2 transport stream (ISO/IEC 13818-1, ITU-T Recommendation H.222.0) or MPEG-DASH. In a variant of the first embodiment the information representative of the energy consumption are inserted in a MPEG DASH Media Presentation Description (MPD).

In addition, in some cases, bitstreams may be encrypted, which would render the information representative of the energy consumption embedded in said bitstreams inaccessible to some aware nodes of the multimedia streaming chain. In a variant of the first embodiment, the information representative of the energy consumption, whether transported in SEI messages, in a MPEG-2 transport stream or in MPEG DASH MPD, is attached aside to the bitstream, but not embedded in it, and transmitted in a separate unencrypted bitstream.

FIG. 2B represents a second embodiment of a solution allowing collecting energy consumption information all along a multimedia streaming chain.

The second embodiment of FIG. 2B is executed in the multimedia streaming chain described in reference to FIG. 2A.

In the second embodiment represented in FIG. 2B, only the source 1 generates a SEI message and embeds it in the original bitstream. The headend 2 extracts said SEI message from the original bitstream and updates the information representative of the energy consumption stored in this SEI message with its own energy consumption information.

If a specific SEI message is inserted (or inserted per period) in each bitstream for each bitstream i, the SEI message is updated by the headend 2 with energy consumption information corresponding to the bitstream i and embedded in the bistream i. Then, for each bitstream i, the SEI message embedded in said bitstream i is updated by the server 3 and the CDN 41 with their own energy consumption information. Hence, in this variant, there is one SEI message in each bitstream i, instead of a plurality as in the first embodiment.

In another variant of the second embodiment, the headend 2 computes only one information representative of the energy consumed by the headend 2 to generate the bitstreams corresponding to all profiles. In that case, the headend 2 updates the SEI message generated by the source 1 with this information. The updated SEI message is then either embedded in one of the bitstreams and sent to the server 3 or sent to the server 3 in an independent bitstream transporting only the SEI message. Then, the server 3 and the CDN 41 updates successively this SEI message with their own energy consumption information.

All other variants of the first embodiment apply identically to the second embodiment.

The first and the second embodiment can be mixed in a third embodiment wherein first nodes generate SEI messages while second nodes just update the SEI messages generated by a first node.

Figure 3:
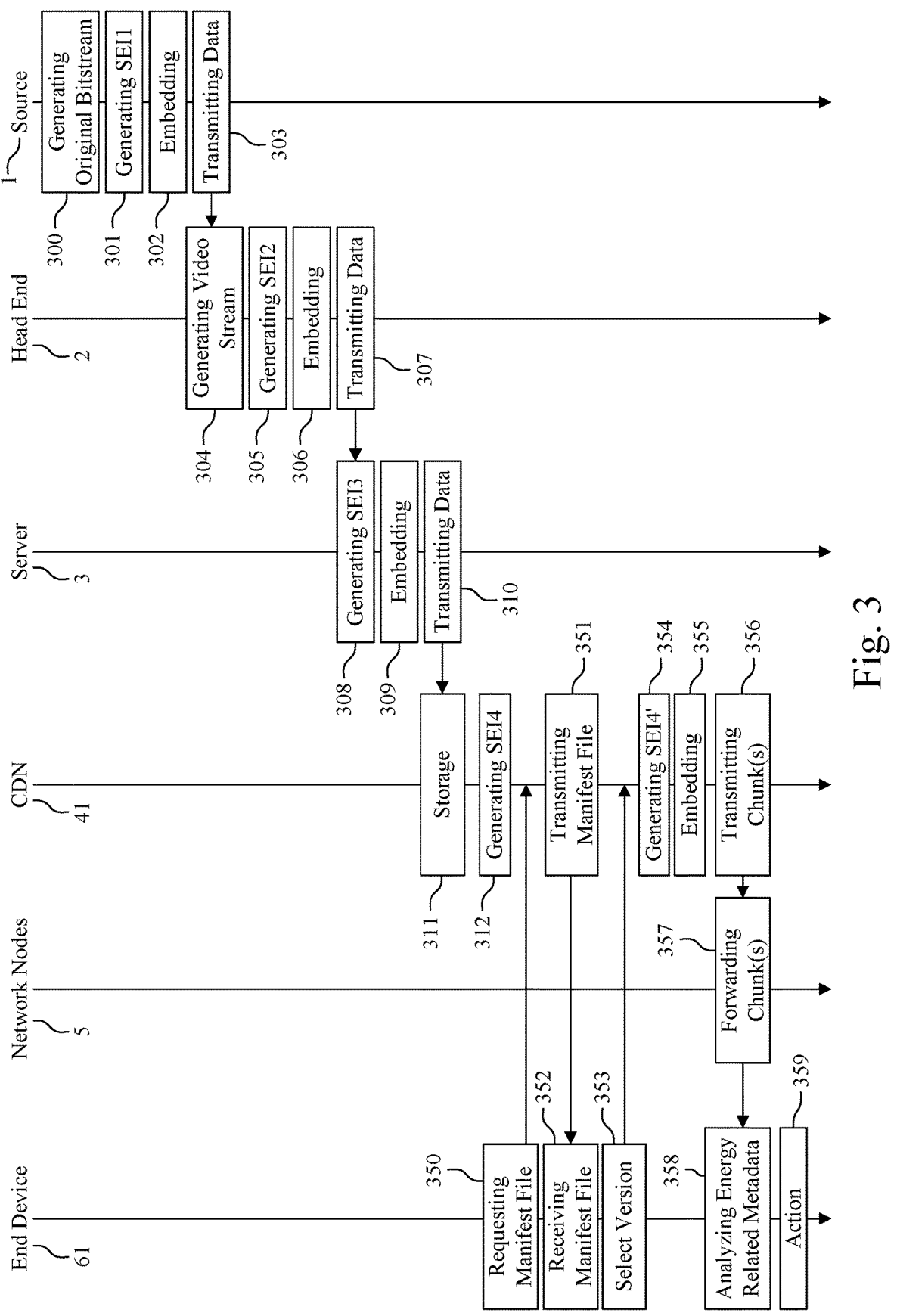
FIG. 3 depicts schematically a method for collecting energy consumption information all along a multimedia streaming chain.
Figure 4:
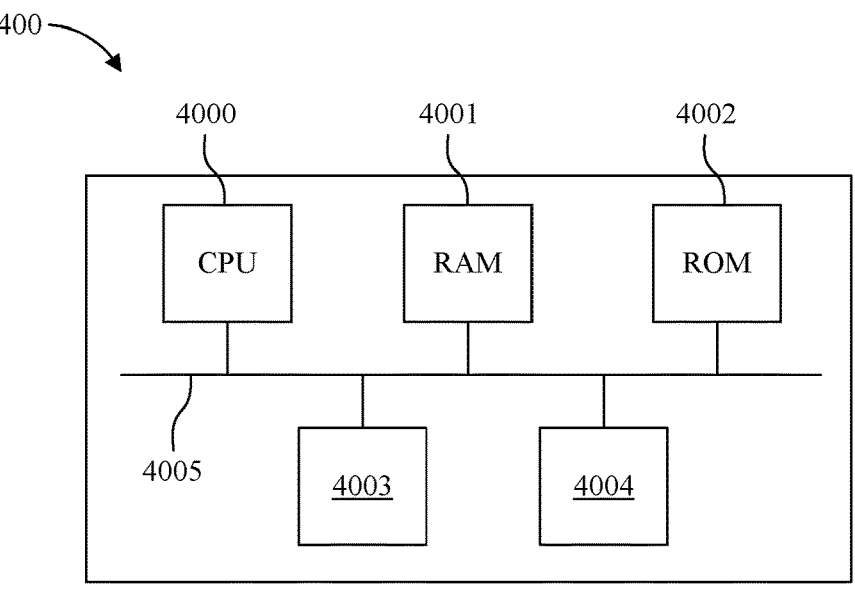
FIG. 4 illustrates schematically an example of hardware architecture of a processing module able to implement various embodiments.
Figure 6:
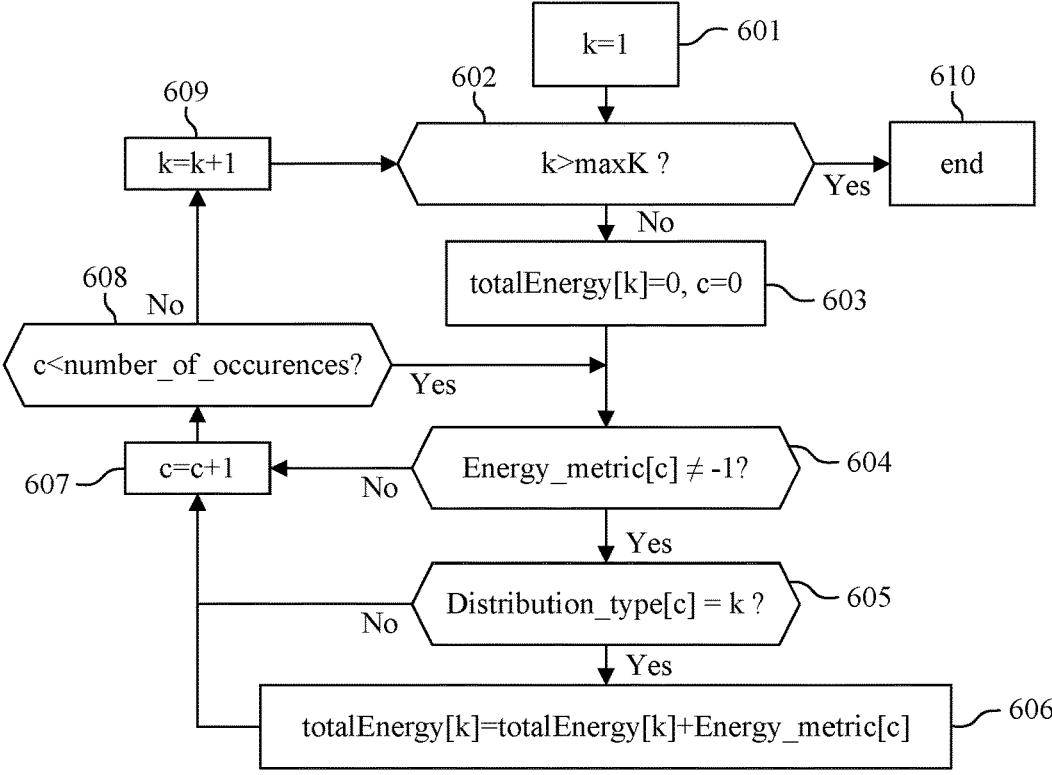
FIG. 6 illustrates schematically an embodiment of step of analysis of energy consumption information.
Figure 7:
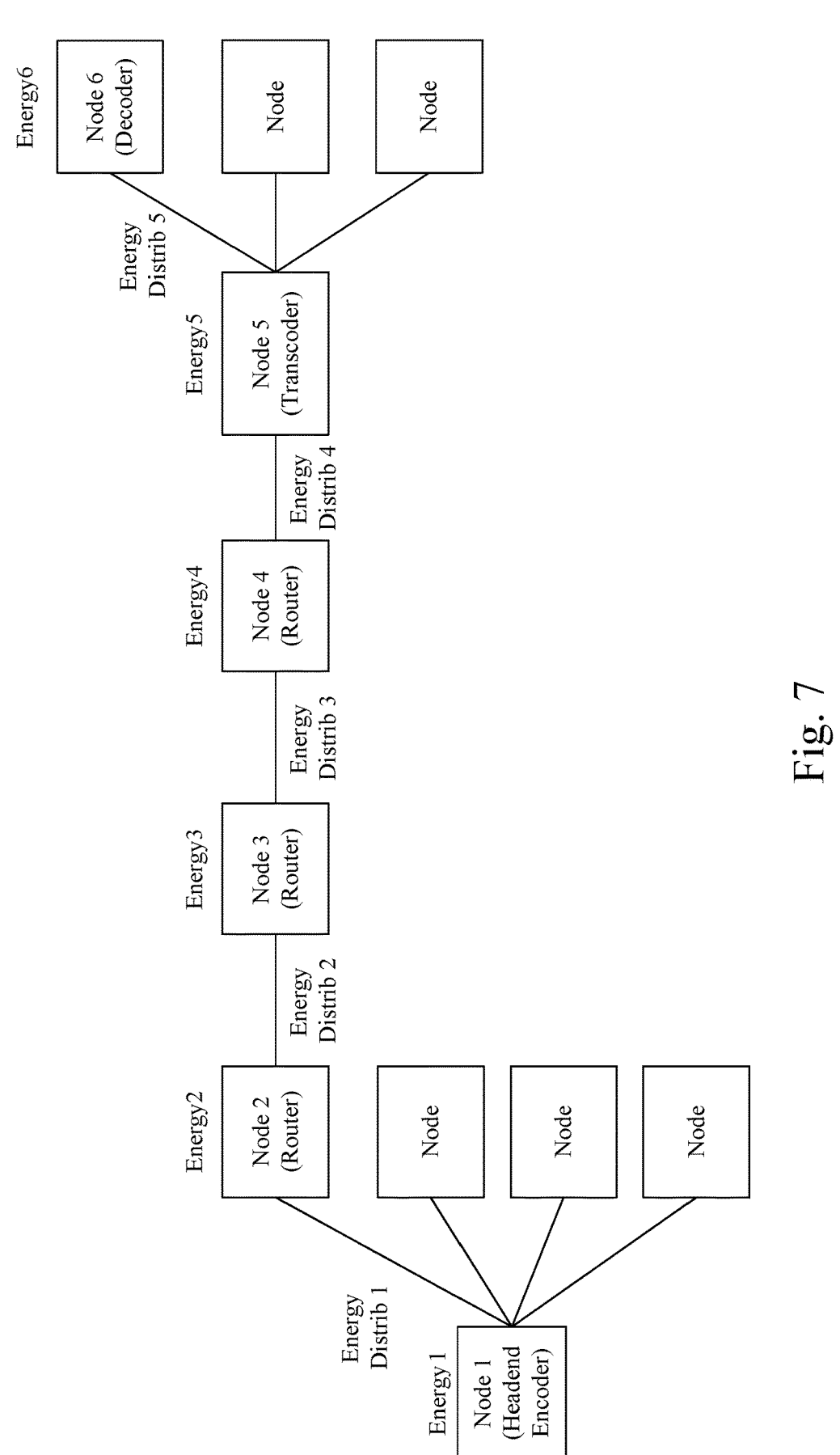
FIG. 7 illustrates schematically a simple example of multimedia streaming chain including different types of nodes, each node generating its specific energy cost; and, FIG. 8 illustrates an example of process for estimating the information representative of an energy consumption and of a video quality.

FIG. 4 illustrates schematically an example of hardware architecture of a processing module 400 able to implement embodiments described above in relation to FIGS. 2A, 2B and latter in relation to FIGS. 3, 6 and 7. The processing module is for example comprised in the source 1, the headend 2, the server 3, aware nodes of the CDN 41, and in the end device 61. The processing module 400 comprises, connected by a communication bus 4005: a processor or CPU (central processing unit) 4000 encompassing one or more microprocessors, general purpose computers, special purpose computers, and processors based on a multi-core architecture, as non-limiting examples; a random access memory (RAM) 4001; a read only memory (ROM) 4002; a storage unit 4003, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive, or a storage medium reader, such as a SD (secure digital) card reader and/or a hard disc drive (HDD) and/or a network accessible storage device; at least one communication interface 4004 for exchanging data with other modules, devices or equipment. The communication interface 4004 can include, but is not limited to, a transceiver configured to transmit and to receive data over communication channel. The communication interface 4004 can include, but is not limited to, a modem or network card.

If the processing module 400 is comprised in the source 1, the communication interface 4004 enables for instance the processing module 400 to receive a non-encoded multimedia content and to transmit an original bitstream.

If the processing module 400 is comprised in the headend 2, the communication interface 4004 enables for instance the processing module 400 to receive the original bitstream and to transmit bitstreams corresponding to a plurality of profiles along with SEI messages in the form of chunks.

If the processing module 400 is comprised in the server 3, the communication interface 4004 enables for instance the processing module 400 to receive the chunks and to transmit these chunks to a plurality of CDN.

If the processing module 400 is comprised in a replication server of the CDN 41, the communication interface 4004 enables for instance the processing module 400 to receive the chunks and to transmit chunks corresponding to a requested profile to a end device.

If the processing module 400 is comprised in the end device 61, the communication interface 4004 enables for instance the processing module 400 to receive the chunks corresponding to a requested profile.

The processor 4000 is capable of executing instructions loaded into the RAM 4001 from the ROM 4002, from an external memory (not shown), from a storage medium, or from a communication network. When the processing module 400 is powered up, the processor 4000 is capable of reading instructions from the RAM 4001 and executing them. These instructions form a computer program causing, for example, the implementation by the processor 4000 of various steps or aspects of the embodiments described in relation to FIG. 2A, 2B, 3, 6 or 7.

All or some of the algorithms and steps of said embodiments may be implemented in software form by the execution of a set of instructions by a programmable machine such as a DSP (digital signal processor) or a microcontroller, or be implemented in hardware form by a machine or a dedicated component such as a FPGA (field-programmable gate array) or an ASIC (application-specific integrated circuit).

Figure 5A:
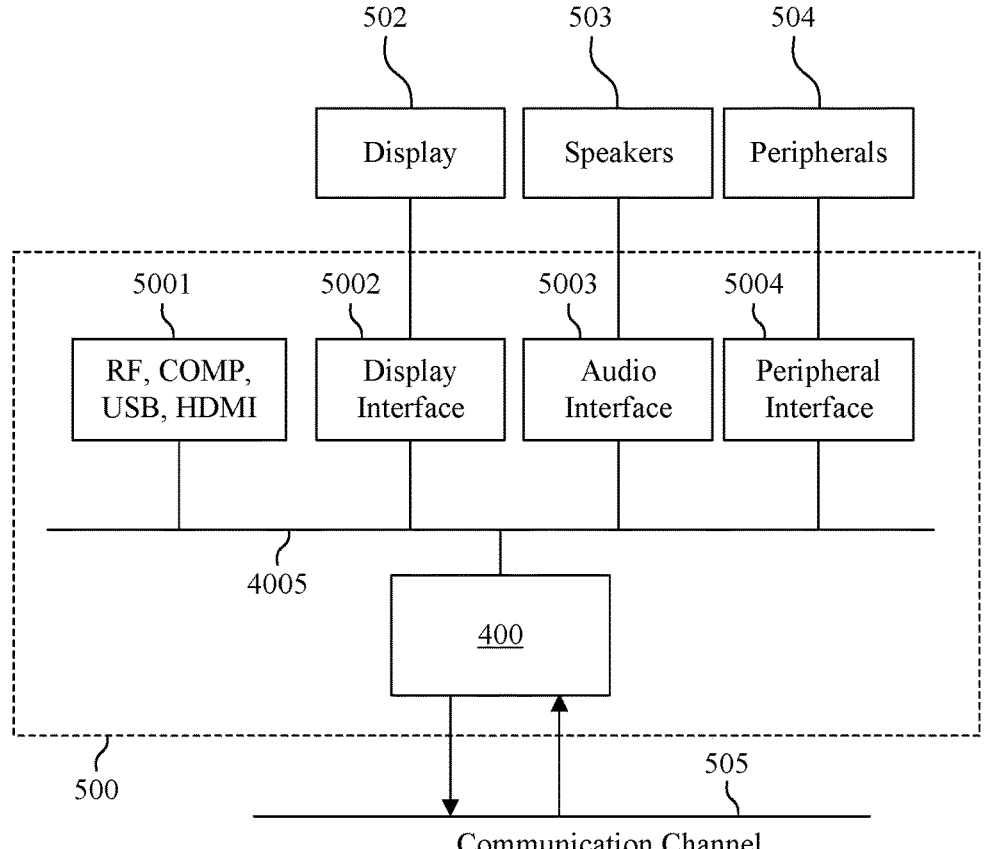
FIG. 5A illustrates a block diagram of an example of a first system in which various aspects and embodiments are implemented.

FIG. 5A illustrates a block diagram of an example of a system 500 in which various aspects and embodiments are implemented. The system 500 can be embodied in any end device 6 including the various components described below and is configured to perform one or more of the aspects and embodiments described in this document. Examples of such end devices 6 include, but are not limited to, various electronic devices such as personal computers, laptop computers, smartphones, tablet computers, digital multimedia set top boxes, digital television receivers, personal video recording systems, connected home appliances, and servers. Elements of system 500, singly or in combination, can be embodied in a single integrated circuit (IC), multiple ICs, and/or discrete components. For example, in at least one embodiment, the system 500 comprises one processing module 400 that implements various steps concerning an end device 6 of embodiments described in this document. In various embodiments, the system 500 is communicatively coupled to one or more other systems, or other electronic devices, via, for example, a communication bus or through dedicated input and/or output ports. In various embodiments, the system 500 is configured to implement one or more of the aspects described in this document.

The input to the processing module 400 can be provided through various input modules as indicated in block 5001. Such input modules include, but are not limited to, (i) a radio frequency (RF) module that receives an RF signal transmitted, for example, over the air by a broadcaster, (ii) a component (COMP) input module (or a set of COMP input modules), (iii) a Universal Serial Bus (USB) input module, and/or (iv) a High Definition Multimedia Interface (HDMI) input module. Other examples, not shown in FIG. 5A, include composite video.

In various embodiments, the input modules of block 5001 have associated respective input processing elements as known in the art. For example, the RF module can be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF module of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. In one set-top box embodiment, the RF module and its associated input processing element receives an RF signal transmitted over a wired (for example, cable) medium, and performs frequency selection by filtering, down-converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF module includes an antenna.

Additionally, the USB and/or HDMI modules can include respective interface processors for connecting system 500 to other electronic devices across USB and/or HDMI connections. It is to be understood that various aspects of input processing, for example, Reed-Solomon error correction, can be implemented, for example, within a separate input processing IC or within the processing module 400 as necessary. Similarly, aspects of USB or HDMI interface processing can be implemented within separate interface ICs or within the processing module 400 as necessary. The demodulated, error corrected, and demultiplexed stream is provided to the processing module 400.

Various elements of system 500 can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the system 500, the processing module 400 is interconnected to other elements of said system 500 by the bus 4005.

The communication interface 4004 of the processing module 400 allows the system 500 to communicate on a communication channel 505. The communication channel 505 can be implemented, for example, within a wired and/or a wireless medium.

Data is streamed to the system 500, in various embodiments, using a wireless network such as a Wi-Fi network, for example IEEE 802.11 (IEEE refers to the Institute of Electrical and Electronics Engineers). The Wi-Fi signal of these embodiments is received over the communications channel 505 and the communications interface 4004 which are adapted for Wi-Fi communications. The communication channel 505 of these embodiments is typically connected to an access point or router that provides access to the network 5 of FIG. 1. Other embodiments provide streamed data to the system 500 using the RF connection of the input block 5001. Additionally, various embodiments use wireless networks other than Wi-Fi, for example a cellular network or a Bluetooth network.

The system 500 can provide an output signal to various output devices, including a display system 502, speakers 503, and other peripheral devices 504. The display system 502 of various embodiments includes one or more of, for example, a touchscreen display, an organic light-emitting diode (OLED) display, a curved display, and/or a foldable display. The display system 502 can be for a television, a tablet, a laptop, a cell phone (mobile phone), or other devices. The display system 502 can also be integrated with other components (for example, as in a smart phone), or separate (for example, an external monitor for a laptop). The other peripheral devices 504 include, in various examples of embodiments, one or more of a stand-alone digital video disc (or digital versatile disc) (DVR, for both terms), a disk player, a stereo system, and/or a lighting system. Various embodiments use one or more peripheral devices 504 that provide a function based on the output of the system 500. For example, a disk player performs the function of playing an output of the system 500.

In various embodiments, control signals are communicated between the system 500 and the display system 502, speakers 503, or other peripheral devices 504 using signaling such as AV.Link, Consumer Electronics Control (CEC), or other communications protocols that enable device-to-device control with or without user intervention. The output devices can be communicatively coupled to system 500 via dedicated connections through respective interfaces 5002, 5003, and 5004. Alternatively, the output devices can be connected to system 500 using the communication channel 505 via the communications interface 4004. The display system 502 and speakers 503 can be integrated in a single unit with the other components of system 500 in an electronic device such as, for example, a television. In various embodiments, the display interface 5002 includes a display driver, such as, for example, a timing controller (T Con) chip.

The display system 502 and speaker 503 can alternatively be separate from one or more of the other components. In various embodiments in which the display system 502 and speakers 503 are external components, the output signal can be provided via dedicated output connections, including, for example, HDMI ports, USB ports, or COMP outputs.

Figure 5B:
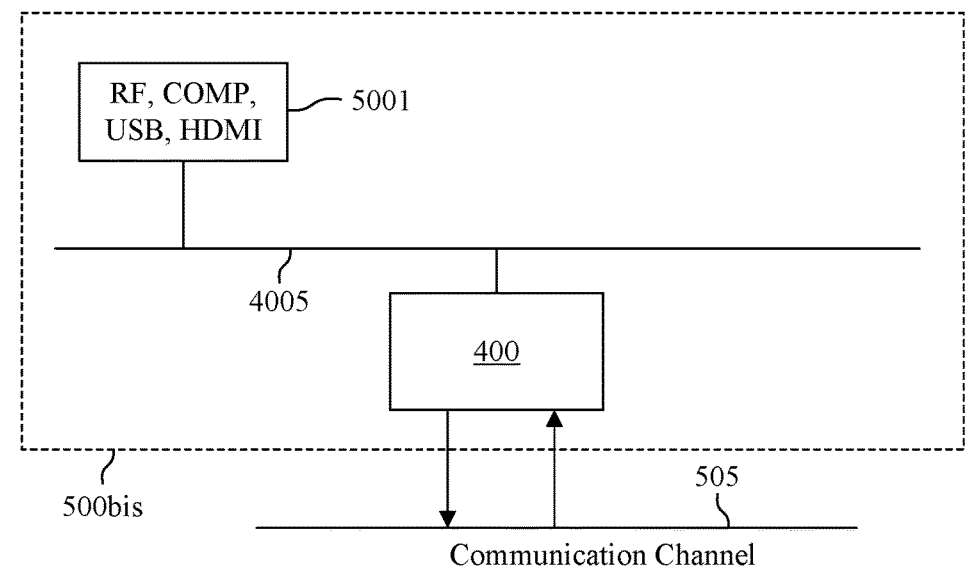
FIG. 5B illustrates a block diagram of an example of a second system in which various aspects and embodiments are implemented.

FIG. 5B illustrates a block diagram of an example of a system 500bis in which various aspects and embodiments are implemented. The system 500 can be embodied in the source 1, the headend 2, the server 3 or an aware node of the CDN 41 including the various components described below and is configured to perform one or more of the aspects and embodiments described in this document. Elements of system 500bis, singly or in combination, can be embodied in a single integrated circuit (IC), multiple ICs, and/or discrete components. For example, in at least one embodiment, the system 500bis comprises one processing module 400 that implements various steps concerning a source, a headend, a server or an aware node of a CDN of embodiments described in this document. In various embodiments, the system 500bis is communicatively coupled to one or more other systems, or other electronic devices, via, for example, a communications bus or through dedicated input and/or output ports. In various embodiments, the system 500*bis* is configured to implement one or more of the aspects described in this document.

The input to the processing module 400 can be provided through various input modules as indicated in block 5001 already described in relation to FIG. 5A.

Various elements of system 500*bis* can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the system 500*bis*, the processing module 400 is interconnected to other elements of said system 500*bis* by the bus 4005.

The communication interface 4004 of the processing module 400 allows the system 500*bis* to communicate with other nodes of the multimedia streaming chain of FIG. 1.

Note that the syntax elements names as used in the present document, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented, for example, in a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, retrieving the information from memory or obtaining the information for example from another device, module or from user.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", "one or more of" for example, in the cases of "A/B", "A and/or B" and "at least one of A and B", "one or more of A and B" is intended to encompass the selection of the first listed option (A) only, or the selection of the second listed option (B) only, or the selection of both options (A and B). As a further example, in the cases of "A, B, and/or C" and "at least one of A, B, and C", "one or more of A, B and C" such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments, a node of a multimedia streaming chain signal energy consumption information in a SEI message. In this way, in an embodiment these information are decoded and used by the end device to determine an energy consumed by a multimedia streaming application. It is to be appreciated that signaling can be accomplished in a variety of ways. For example, one or more syntax elements, flags, and so forth are used to signal energy consumption information to a end device in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry a bitstream embedding SEI messages of a described embodiment. Such a signal can be formatted, for example, as an electromagnetic wave (for example, using a radio frequency portion of spectrum) or as a baseband signal. The formatting can include, for example, encoding a bitstream and modulating a carrier with the bit stream. The information that the signal carries can be, for example, analog or digital information. The signal can be transmitted over a variety of different wired or wireless links, as is known. The signal can be stored on a processor-readable medium.

FIG. 3 depicts schematically a method for collecting energy consumption information all along a multimedia streaming chain.

The method of FIG. 3 is executed in the multimedia streaming chain described in relation to FIG. 2A. This method comprises two asynchronous phases. A first phase comprising steps 300 to 312 corresponds to a storage of chunks of various profile of a multimedia content on the CDN 41. A second phase corresponds to a streaming of a profile of the multimedia content from the CDN 41 to the end device 61 and comprises steps 350 to 359.

In FIG. 3, the vertical arrows correspond to timelines.

In a step 300 the processing module 400 to the source 1 generates an original bitstream from a multimedia content. The multimedia content is for example and AV (Audio/ video) stream comprising a video sub-stream, an audio-sub-stream and a metadata sub-stream comprising for example sub-titles.

In a step 301, the processing module 400 of the source 1 determines an energy consumed by the source 1 for generating the original bitstream, creates a SEI message SEI1 and inserts an information representative of the determined energy in said SEI message SEI1. The consumed energy is for example measured using an external power meter connected to the source 1. Another possibility to measure the energy consumed by the source 1 without an external power meter is "Running Average Power Limit" (RAPL), which is an integrated power meter within modern Intel CPUs (see "K. N. Khan, M. Hirki, T. Niemi, J. K. Nurminen, and Z. Ou. RAPL in Action: Experiences in Using RAPL for Power Measurements, ACM Trans. Model. Perform. Eval. Comput. Syst. 3(2), 9:1-9:26, March 2018." and "S. Labassan, J. Shafer, R. Goldstone, B. Rountree, Intel Running Average Power Limit Technology", http://ix.cs.uoregon.edu/~sla-basan/webdocs/posters/IntelRAPL_SC12.pdf).

In a step 302, for example, the processing module 400 of source 1 embeds the SEI message SEI1 in the original bitstream.

In the step 303, the processing module 400 of the source 1 transmits the original bitstream embedding the SEI message SEI1 to the headend 2.

In a step 304, the processing module 400 of the headend 2 receives the original bitstream and generates the bitstreams corresponding to a plurality of profiles.

In a step 305, the processing module 400 of the headend 2 computes the energy consumed by the headend 2 to generate all the bitstreams from the original bitstream. To do so, the processing module 400 use one of the solutions evocated in relation to step 301. In the example of FIG. 3, the processing module 400 creates only one SEI message SEI2 and inserts the computed energy consumption information in the SEI message SEI2.

In a step 306, the processing module 400 of the headend 2 embeds the SEI message SEI2 in one of the bitstreams.

In the step 307, the processing module 400 of the headend 2 transmits the bitstreams to the server 3 in the form of chunks.

In a step 308, the processing module 400 of the server 3 receives the bitstreams and generates a SEI message SEI3. The SEI message SEI3 comprises information representative of the energy consumed by the server 3 to receive and forward the chunks to the CDN 41. To do so, the processing module 400 of the server 3 uses one of the solutions evocated in relation to step 301 to determine the energy consumed by the server 3 to receive and forward chunks. For example, the processing module 400 measure the energy consumed to receive and forward a set of chunks, divides the measured energy by the amount of chunks in the set to obtain an average energy consumed for one chunk, and uses this average to evaluate the energy consumed for receiving and forwarding the next chunks. Accordingly, the processing module 400 of the server 3 can compute an information representative of the energy consumed by the server 3 to receive and forward chunks without waiting for these chunks being actually sent.

In a step 309, the processing module 400 of the server 3 embeds the SEI message SEI3 in one of the bitstreams.

In a step 310, the processing module 400 of the server 3 transmits the chunks corresponding to all bitstreams to the CDN 41.

As said earlier, it is considered that the CDN 41 is constituted of at least one router (unaware node) followed by a replication server (aware node). In a step 311, the processing module 400 of the replication server receives the chunks corresponding to all bitstreams and stores them.

In step 312 the processing module 400 of the replication server computes an information representative of the energy consumed by the CDN 41 to receive and store the chunks. This information comprises a first part representative of an evaluation of the energy consumed by the at least one router of the CDN 41 and a second part representative of the energy consumed by the replication server. The first part is computed using the method for computing the energy consumed by unaware nodes described above in a variant of the first embodiment in relation to FIG. 2A. We suppose here that the processing module 400 of the server 3 has inserted a TTL in a SEI message SEI3 sent to the CDN 41. Then the processing module 400 of the replication server compares the TTL stored in the SEI message SEI3 to the TTL of the packet transporting this SEI message to evaluate the energy consumed by the routers of the CDN 41. The processing module 400 of the replication server uses one of the solutions described in relation to step 301 to compute the energy consumed by the replication server to receive and store the chunks. During step 312, the processing module 400 of the replication server 41 creates a SEI message SEI4 and inserts the information representative of the energy consumed by the CDN 41 in the SEI message SEI4.

In case of SEI messages generated by periods of the multimedia content, steps 300 to 312 are repeated for each period.

In step 350, the processing module 400 of the end device 61 sends a first request to the CDN 41 (i.e. to the replication server of the CDN 41) via the network 5 to obtain a manifest corresponding to the multimedia content.

Upon reception of this first request, the processing module 400 of the replication server transmits the manifest file to the end device 61 via the network 5 in a step 351.

Upon reception of the manifest file, in a step 352, the processing module 400 of the end device 61 selects one profile and transmits an information representative of the selected profile to the CDN 41 via the network 5 in a step 353. Step 353 allows requesting a selected profile to the CDN 41.

Upon reception of the information representative of the selected profile, in a step 354, the processing module 400 of the replication server generates a SEI message SEI4'. The SEI message SEI4' represents the energy consumed by the replication server to transmit chunks to the end device 61. To do so, the processing module 400 of the replication server can use the method for computing the energy consumed for transmitting chunks described in relation to step 308.

In a step 355, the SEI messages SEI1, SEI2, SEI3, SEI4 and SEI4' are embedded in the bitstream corresponding to the requested profile.

In a step 356, the chunks of the bitstream corresponding to the requested profile are transmitted to the end device 61.

In a step 357, the chunks are received by network nodes of the network 5 and forwarded in direction of the end device 61.

In a step 358, the processing module 400 of the end device 61 receives the chunks and the SEI messages. During step 358, the processing module 400 of the end device 61 computes the energy consumed by the network nodes of the network 5 to receive and forward the chunks. We suppose here that the processing module 400 of the replication server has inserted a TTL in a SEI message SEI4' sent to the end device 61. Then the processing module 400 of the end device 61 compares the TTL stored in the SEI message SEI4' to the TTL of the packet transporting this SEI message to evaluate the energy consumed by the network nodes of the network 5. In addition, the processing module 400 of the end device 61 uses one of the solutions described in relation to step 301 to compute the energy consumed by the end device 61 to receive and play the multimedia content.

Then, the processing module 400 of the end device 61 analysis the energy consumption information it has received or computed. To do so, in a first embodiment of step 358, the processing module 400 of the end device 61 sums the energy consumption information contained in each SEI message it has received to the energy consumed by the end device 61 to obtain the energy consumed globally by the ongoing multimedia streaming session.

In step 359, an action is taken by the end device 61. In a first embodiment of step 359, an action could be to display an information representing the energy consumed by the ongoing multimedia streaming session on a display device integrated into the end device 61 or connected to the end device 61. A user using the end device 61 could be then incited to reduce the energy consumed by the ongoing multimedia streaming application. For example, the user can decide to prevent a selection of any profile corresponding to a resolution higher than a maximum resolution and/or to a frame rate higher than a maximum frame rate and/or to a bitrate higher than a maximum bitrate. In this first embodiment of step 359, the user selects a new profile based on the displayed energy information and transmits an information representative of the selected profile to the CDN 41 via the network 5 going back to step 353.

In second embodiment of step 359, an action could be to forward the information representing the energy consumed by the ongoing multimedia streaming session to the headend 2. Upon reception of this information, if it considers a reduction of the energy is required, the processing module 400 of the headend 2 reduces the amount of profiles it considers. Consequently, the amount of bitstreams the headend 2 generates and transmits to the CDN 41 for storage is reduced, which reduces the energy consumption of the multimedia streaming session.

In a third embodiment of step 359, a set of energy modes enabling a user to control its energy impact when consuming multimedia contents is defined in the end device 61. The energy modes correspond typically to recommended or preferred energy consumption levels, that can be propagated to the CDN 41 for the selection of profiles. In this embodiment, the user is fully aware, and actor of his energy consumption related to his multimedia content consumption. When he starts a multimedia streaming session, a menu appears on its display (either the display of the end device

61 or of a display device connected to the end device 61) representing various energy modes that can be selected. His choice may be in relation with the type of multimedia content he wants to watch and/or his available attention to the content and/or his personal engagement in energy consumption in general.

Each energy mode corresponds to a different profile. Each profile corresponding to a different quality, bitrate, resolution, is associated to an energy consumption score. For example, the higher the video capabilities or features (eg. HDR, 4K native, high bitrates), the higher the energy consumption.

Table TAB6 represents a plurality of energy modes:

TABLE TAB6

| Mode | Bitrate (MBits/ sec) | Resolution | Up- sampling | Comments |
|---|---|---|---|---|
| 1 | 8.0 | 1920 × 1080 | Simple | Eco mode |
| 2 | 12.0 | 1920 × 1080 | Complex | Intermediary mode |
| 3 | 12.0 | 3840 × 2160 | No | Intermediary mode |
| 4 | 20.0 | 1920 × 1080 | Complex | Good quality mode |
| 5 | 20.0 | 3840 × 2160 | No | Good quality mode |
| 6 | 30.0 | 3840 × 2160 | No | Top quality: default mode from manufacturer, energy may be saved with ABC and MDD mechanisms) |
| 7 | 30.0 | 3840 × 2160 | No | Top quality and personal settings applied (vivid color, HDR mode . . . |

In table TAB6, the first column indicates a mode number. The second column indicates an average bitrate of the corresponding mode. The third column indicates an image resolution of the mode. The fourth column indicates if the mode comprises a up-sampling and, if yes, if said up-sampling is complex or not. For example, modes 5-7 don't comprise an up-sampling. Mode 1 comprises a simple up-sampling implemented, for example, by a Lanczos type up-sampling process. Mode 2 comprises a complex up-sampling implemented by a deep-learning based up-sampling process. The fifth column provides some comments on the modes. Automatic Brightness Control (ABC) and Automatic Brightness Control (ABC) and Motion Detection Dimming (MDD) are two process generally implemented in display device such as TV allowing playing with TV backlight in order to reduce energy consumption. ABC is an adaptation of screen brightness based on ambient light measured by embedded sensor. MDD also reduces automatically and temporally the screen brightness based on rapid onscreen motion, which are frequent scene cuts such as appearing in commercials and music clips. On the contrary, Using the vivid color mode or the HDR (High Dynamic Range) mode increases the energy consumption. The vivid color mode boosts the colors by saturating them. The HDR mode increases the dynamic range of luminance and color components of images. Note that some modes may have the same complexity. For example, the modes 2 and 3 have the same (or a similar) complexity, the use of a complex up-sampling being compensated by the complexity of decoding a higher resolution. In that case, the choice of the mode may be let to the user. In this third embodiment, for example, the user of the end device 61 selects one of the energy modes in the set of displayed energy modes. The profile corresponding to the selected energy mode in then requested to the CDN 41 going back to step 353. The end device 61 receives therefore a profile corresponding to the energy mode selected by the user.

Steps 353 to 359 are repeated all along the multimedia streaming session. One can note that steps 300 to 312 and steps 350 to 359 (or 353 to 359) can be performed in parallel.

In a variant of the method of FIG. 3, an action could be taken by another node of the multimedia streaming chain in view of the information representative of the energy consumption it receives. This action could be taken in place or in addition to the action performed by the end device 61. For example, if the information representative of the energy consumed by the source 1 it receives in the SEI message SEI1 is higher than a maximum energy, the processing module 400 of the headend 2 decides to reduce the amount of profiles it considers. Indeed, a high energy consumption in the source 1 may indicate that the multimedia content is complex and that generating bitstreams corresponding to all possible profiles for this multimedia content would represent a heavy workload for the headend 2.

Note that the method of FIG. 3 corresponds to one variant of the embodiments described in relation to FIGS. 2A and 2B. However, this method is not restricted to this variant but can be also adapted to other variants described in relation to FIGS. 2A and 2B. For example, when a SEI message is not generated by each node but generated by a first node (here generated by the source 1) and then updated by other nodes, the generation of SEI messages SEI2, SEI3, SEI4 and SEI4' in steps 305, 308, 312 and 354 is replaced by successive updates of the SEI message generated by the first node.

As described earlier, some embodiments or variants of embodiments described above are based on SEI messages. If we take the example of a bitstream encoded according to the standard HEVC, a SEI message is encapsulated into SEI NAL Units described for example in the document Rickard Sjöberg, et al., *Overview of HEVC High-Level Syntax and Reference Picture Management*, TCSVT 2012. https://iee-explore.ieee.org/stamp/stamp.jsp?arnumber=6324417. The update, the rewrite or the addition of a SEI message by a network node can for example follow a method described in the document Y. Sanchez, R. Globisch, T Schierl, T Wiegand, *"Low Complexity Cloud-video-Mixing Using HEVC"*, 2014. http://iphome.hhi.de/schierl/assets/2014_Cloud-video-Mixing-HEVC.pdf.

A first example of a syntax of a SEI message transporting information representative of an energy consumption, called energy-related SEI message in the following, is provided in the table TAB1. In this example, it is considered that one energy-related SEI message is generated per node and conveyed to the end-user into a bitstream as SEI message, or as metadata via transport mechanisms such as MPEG2 transport stream or MPEG-DASH.

TABLE TAB1

| Syntax |
| --- |
| energy_usage_indication( payloadSize ) { |
| process_type |
| distribution_type |
| if (distribution_type = = 2) |
| number_of_recipients |
| energy_metric |
| } |

The semantics of the syntax elements is as follows:
The syntax element process type gives an indication of the process performed by the node. For instance:
"1" indicates "encoding" (for example performed by the source 1 to generate the original bitstream or by the headend 2 if it decodes the original bitstream and then encodes the bitstreams corresponding to the various profiles);

"2" indicates "transcoding" (for example performed by the headend 2 for generating directly the bitstreams corresponding to the various profiles from the original bitstream without decoding and re-encoding);

"3" indicates "multiplexing" (for example performed by the headend 2 if it multiplexes all bitstreams in one transport stream);

"4" indicates "decoding" (for example performed by the headend 2 if it decodes the original bitstream and then encodes the bitstreams corresponding to the various profiles);

"5" indicates "server" (for example for the processes executed by the server 3);

"6" indicates "distribution" (for example performed by the server 3 to distribute the chunks to the CDNs);

"7" indicates "router".

The syntax element distribution_type indicates a type of distribution that is applied by the node that generates the energy-related SEI message. It indicates in particular if the distribution is of a type one-to-one (the data delivered by the node are for one single receiver or destination node—for example in that case distribution_type=1), or a type one-to-many (the data delivered by the node are intended to several receivers or destination nodes, such as in a multicast scenario— for example in that case distribution type=2). If distribution_type is equal to "0", it means that this information (one-to-one or one-to-many) is not available. For example, in the example of FIG. 1, the source 1 transmits the original bitstream only to the headend 2. Hence, in that case distribution_type=1 in the SEI message SEI1. The server 3 transmits the bitstreams to a plurality of CDNs 41, 42, 43. In that case distribution_type=2 in the SEI message SEI3. A same profile of the multimedia content could be requested simultaneously by a plurality of end devices via a multicast group managed in the network 5. In that case, a CDN is unable to know how many end devices receive this profile. In that case distribution_type=0 in the SEI message SEI4'.

The syntax element number_of_recipients indicates the amount of receivers or destination nodes. When not known, number_of_recipients is set equal to "0". The value of "0" preferably indicates that the value of the amount of receivers or destination nodes is not known nor available. For example, if the end devices 60, 61 and 62 request directly (without using a multicast group) a same profile to the CDN 41, number_of_recipients=3 in the SEI message SEI4'.

The syntax element energy metric specifies the value of energy consumption involved by the current node. It is for example expressed in Wh units. A negative value (e.g. −1) preferably indicates that the energy metric is not known nor available.

A second example of energy-related SEI message syntax is provided in the table TAB2. In this example, it is considered that the energy-related SEI message once generated by one given node can be updated by subsequent nodes. This energy-related SEI message is typically used in the second embodiment described in relation to FIG. 2B.

TABLE TAB2

| Syntax |
| --- |
| energy_usage_indication( payloadSize ) {<br>  number_of_occurences<br>  for( c=0; c<number_of_occurences; c++) {<br>    process_type[c]<br>    distribution_type[c]<br>    if (distribution_type[c] = = 2)<br>      number_of_recipients [c]<br>    energy_metric[c]<br>  }<br>} |

The semantics of the syntax elements is as follows:

The syntax element number_of_occurences indicates the amount data stored, and it also relates to the number of nodes having processed the SEI message. When the energy-related SEI message is created this syntax element shall be initialized to "1", and incremented each time a new set of information is added to the energy related SEI message.

The other syntax elements are same as explained above, but correspond to arrays indexed by a parameter c that corresponds to one occurrence of data.

Given the current energy-related SEI message state, when a new node processes it, it increments the value of number_of_occurences by one unit, and adds one element to each of the array process_type, distribution_type, number_of_recipients, energy_metric, based on the node data.

For instance, process_type[c] corresponds to the data process_type for the node number c that has processed the energy-related SEI message.

Note that the syntaxes of tables TAB1 and TAB2 allow specifying only one process type per node. Consequently, for nodes implementing a plurality of processes, only one of these processes is represented in the energy-related SEI message. This syntax is adapted when a majority of the energy consumed by a node is consumed by one of the process implemented in this node. However, this assumption may not be valid for some nodes. For example, the energy consumed by a headend may be mainly consumed by the decoding process and the encoding processes. Table TAB3 describes a variant of the syntax of the table TAB1 adapted to nodes implementing a plurality of processes:

TABLE TAB3

| Syntax |
| --- |
| energy_usage_indication( payloadSize ) {<br>  Num_process<br>  For(i=0; i<Num_process; i++){<br>    process_type[i]<br>    energy_metric[i]<br>  }<br>  distribution_type<br>  if (distribution_type = = 2)<br>    number_of_recipients<br>  } |

In the syntax of table TAB3, the syntax elements process_type and energy_metric are tables indexed by a process number. The syntax element Num_process indicates an amount of processes implemented by the concerned node.

Table TAB4 describes a variant of the syntax of the table TAB2 adapted to nodes implementing a plurality of processes:

TABLE TAB4

| Syntax |
| --- |
| energy_usage_indication( payloadSize ) {<br>  number_of_occurences<br>  for( c=0; c<number_of_occurences; c++) {<br>    Num_process[c]<br>    For(i=0; i<Num_process[c];i++){<br>    process_type[c][i]<br>    Energy_metric[c][i]<br>    }<br>    distribution_type[c]<br>    if (distribution_type[c] = = 2)<br>      number_of_recipients[c]<br>  }<br>} |

In the syntax of table TAB4, the syntax elements process_type and energy_metric are tables indexed by an occurrence number and a process number.

In a second embodiment of step 358, the processing module 400 analyzing the energy consumption information (for example, the processing module 400 of the end device 61), uses the information contained in the SEI messages described in relation to table TAB1 or TAB2 to perform this analysis.

In the second embodiment of step 358, the analysis consists in cumulating the energy_metric values of all the received SEI messages attached to the received bitstream, for the different considered distribution_type values.

For instance, in the case of an embodiment using the syntax of an energy-related SEI message of table TAB2, the algorithm of FIG. 6 is applied for calculating the global energy consumed for the distribution types distribution_type=k, with k=1 or 2:

In a step 601, the processing module 400 of the end device 61 initializes a variable k to "1".

In a step 602, the processing module 400 of the end device 61 determines if the variable k is higher than maxK, wherein maxK is equal to "2" here. If k>maxK, the calculation of the global energy ends in a step 610.

Otherwise, in a step 603, the processing module 400 of the end device 61 initialize a variable totalEnergy[k] to "0" and a variable c to "0".

In a step 604, the processing module 400 of the end device 61 determines if the syntax element energy_metric[c] is different from "−1". If energy_metric[c]=−1, step 604 is followed by step 607 wherein the variable c is incremented of one unit.

Step 607 is followed by a step 608 wherein the processing module 400 of the end device 61 determines if all occurrences represented in the received SEI message have been considered. If c<number_of_occurences, step 608 is followed by step 604. If c=number_of_occurences, step 608 is followed by a step 609 wherein the processing module 400 of the end device 61 increments the variable k of one unit. Step 609 is followed by step 602.

If at step 604 energy_metric[c] is different from "−1", step 604 is followed by a step 605. During step 605, the processing module 400 of the end device 61 determines if the distribution type of the occurrence c corresponds to the type k. If distribution_type[c] is different from k, step 605 is followed by step 607. Otherwise, if distribution_type[c]=k, step 605 is followed by a step 606.

In a first embodiment of step 606, the processing module 400 of the end device 61 increments the variable totalEnergy [k] of the value Energy_metric[c]. Step 606 is followed by step 607.

totalEnergy[1] corresponds to the accumulated energy from nodes with distribution_type=1 (one-to-one).

totalEnergy[2] corresponds to the accumulated energy from nodes with distribution_type=2 (one-to-many).

In a second embodiment of step 606, in case of a node implementing a one-to-many distribution (Distribution_type [c]=2), it is considered that the energy consumed by said node is shared by the amount of receivers. In that case, one of said receivers is implicated in only a portion of the energy consumed by said node. To take into account this aspect, in the second embodiment of step 606, the processing module 400 of the end device 61 increments the variable totalEnergy [k] of a value Energy_metric[c]/number_of_recipients[c] when Distribution_type[c]=2.

FIG. 7 illustrates schematically a simple example of multimedia streaming chain including different types of nodes, each node generating its specific energy cost. Energy of distribution between nodes is also represented. Node 1 (headend), node 5 (transcoder) and node 6 (decoder) are aware nodes. Other nodes (routers) are unaware nodes. Some nodes send data to multiple nodes (one-to-many), some to one single destination node (one-to-one). In the example of FIG. 7, it is considered that the energy-related SEI message once generated by one given node can be updated by subsequent nodes. The syntax of energy-related SEI message of table TAB2 is used. In addition, it is considered that a node applies only one process. However, similar processes can be applied when an energy-related SEI message is generated by each node and when some nodes implement a plurality of processes of different types using either the syntax of table TAB1, the syntax of table TAB3 or the syntax of table TAB4.

A possible scenario for the energy_related SEI messages generation, manipulation and interpretation, is illustrated in table TAB5.

TABLE TAB5

| Node | SEI status once processed by the node |
|---|---|
| Node 1 (aware node) | number_of_occurences = 1<br>process_type[0] = 1<br>distribution_type[0] = 2<br>number_of_recipients[0] = 4<br>energy_metric[0] = energy1 |
| Nodes 2 to 4 (unaware nodes) | Not modified |
| Node 5 (aware node) | number_of_occurences = 4<br>process_type[0] = 1<br>distribution_type[0] = 2<br>number_of_recipients[0] = 4<br>energy_metric[0] = energy1<br>process_type[1] = 6<br>distribution_type[1] = 1<br>number_of_recipients[1] = 1<br>energy_metric[1] = estim_energy_distrib1<br>(energy estimation distribution from previous aware node)<br>process_type[2] = 7<br>distribution_type[2] = 1<br>number_of_recipients[2] = 1<br>energy_metric[2] = estim_energy_router1<br>(energy estimation of crossed routers from previous aware node)<br>process_type[3] = 1<br>distribution_type[3] = 2<br>number_of_recipients[3] = 3<br>energy_metric[3] = energy5 |
| Node 6 (aware node) | number_of_occurences = 6<br>process_type[0] = 1<br>distribution_type[0] = 2<br>number_of_recipients[0] = 4<br>energy_metric[0] = energy1 |

TABLE TAB5-continued

| Node | SEI status once processed by the node |
|---|---|
| | process_type[1] = 6<br>distribution_type[1] = 1<br>number_of_recipients[1] = 1<br>energy_metric[1] = estim_energy_distrib1<br>(energy estimation distribution from previous aware node)<br>process_type[2] = 7<br>distribution_type[2] = 1<br>number_of_recipients[2] = 1<br>energy_metric[2] = estim_energy_router1<br>(energy estimation of crossed routers from previous aware node)<br>process_type[3] = 1<br>distribution_type[3] = 2<br>number_of_recipients[3] = 3<br>energy_metric[3] = energy5<br>process_type[4] = 6<br>distribution_type [4] = 1<br>number_of_recipients[4] = 1<br>energy_metric[4] = estim_energy_distrib4<br>(energy estimation distribution from previous aware node)<br>process_type[5] = 4<br>distribution_type [5] = 1<br>number_of_recipients[5] = 1<br>energy_metric[5] = energy6 |

When applying the algorithm of FIG. 6, in case of the first embodiment of step 606:

totalEnergy[1]=estim_energy_distrib1+estim_ energy_router1+estim_energy_distrib4+energy6.

totalEnergy[2]=energy1+energy5.

In case of the second embodiment of step 606:

totalEnergy[1]=estim_energy_distrib1+estim_ energy_router1+estim_energy_distrib4+energy6.

totalEnergy[2]=energy1/4+energy5/3.

In both embodiments, the total energy consumed by the multimedia streaming session is totalEnergy[1]+totalEnergy [2].

Until now, it has been considered that the information representative of the energy consumption is contained in SEI messages embedded in bitstreams or distributed via transport mechanisms such as MPEG2 transport stream or MPEG-DASH.

In an embodiment, the information representative of an energy consumption is estimated and inserted into the manifest files associated with the chunks. The estimation and insertion process is achieved by any of the nodes manipulating (i.e. creating) chunks in the multimedia streaming chain (i.e. a headend, a CDN, a transcoder, an end device) prior to encoding of the chunks, or once the encoding of each chunk has been done. The manifest can then be updated when passing the different nodes of the multimedia streaming chain.

In a variant of the embodiment based on a use of a manifest file, nodes unable to manipulate manifest files use other means for transporting the information representative of an energy consumption such as SEI messages, MPEG2 transport stream or MPEG-DASH. Nodes capable of handling manifest files can then collect this information and add it in manifest files.

In an embodiment, in addition to an information representative of an energy consumption, an information representative of a video quality is collected in the multimedia streaming chain. The information representative of a video quality can be generated by an intermediate node or received from a preceding node of the multimedia streaming chain involved in the multimedia streaming application. For instance, the information representative of a video quality is computed by the source 1, the headend 2, the CDN 41, 42, 43, and eventually transcoders if present in the multimedia streaming chain.

In an embodiment, instead of letting each node estimating the energy it consumes (and the video quality of the chunks it generates when appropriate) and providing an information representative of this energy (and quality when appropriate) to an end device, one node of the multimedia streaming chain is in charge of estimating the energy consumed in the multimedia streaming chain using models. An example process for estimating the information representative of an energy consumption and of a video quality in that case is described hereafter in relation to FIG. 8. The process of FIG. 8 is executed by any node capable of estimating a video quality, i.e. the source 1, the headend 2, the CDN 41, 42, 43, and eventually (a) transcoder(s).

Figure 8:
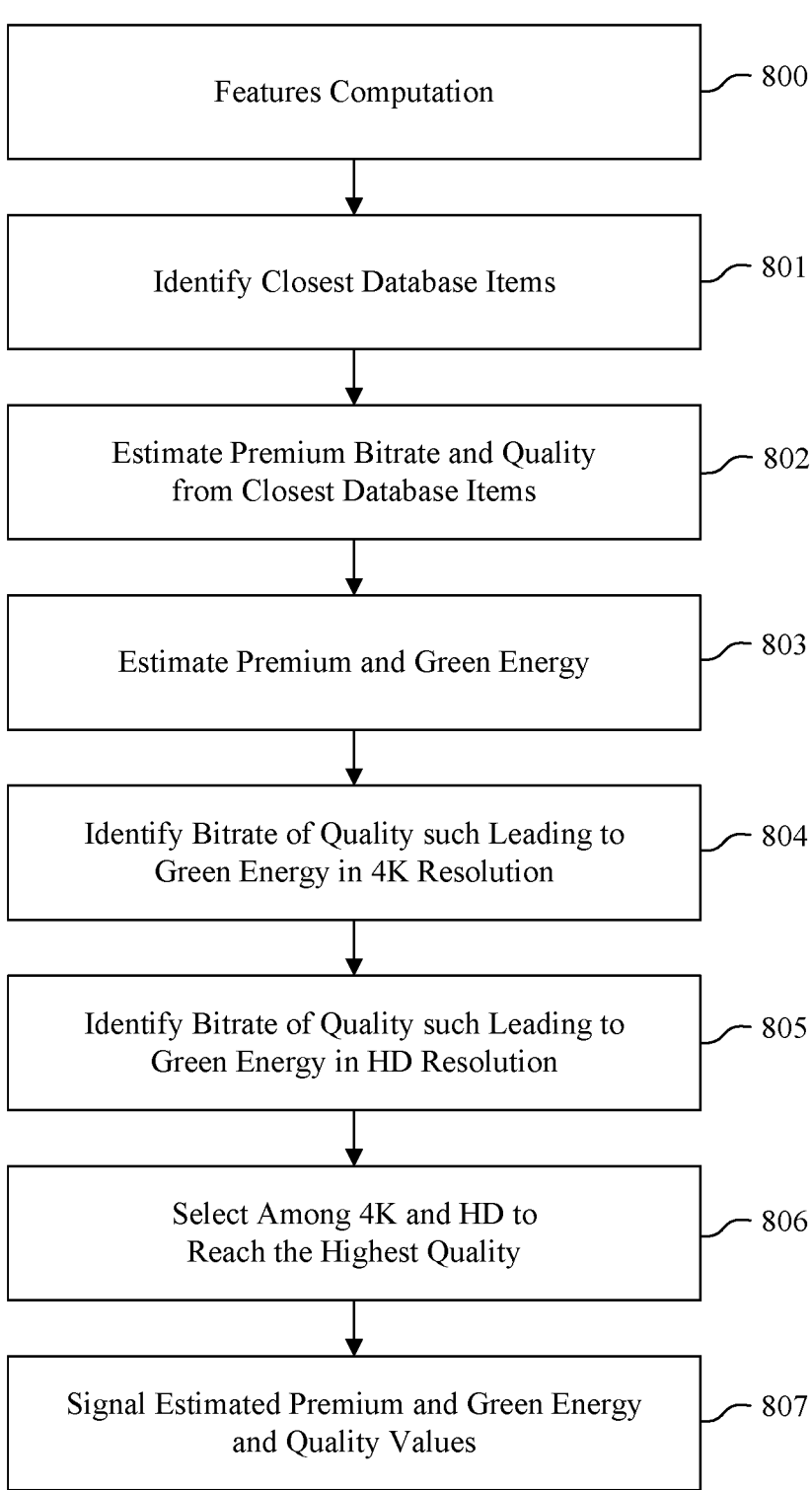

In the process of FIG. 8, it is considered that only two representations of the content are used, one "premium" representation of highest quality, and one "green" representation of possibly lower quality than the premium representation, but with lower energy impact than the premium representation. The relative energy savings indicator $r_{energy}$ of the green representation relative to the premium representation can be a pre-defined value, for instance $r_{energy}=50\%$. In other variants of the process of FIG. 8, more than two representations are used with a premium representation and additional representation each associated to a relative energy savings indicator with respect to the premium representation.

In the process for estimating the information representative of an energy consumption and of a video quality of FIG. 8, it is also considered that a target quality level VMAFmax is predefined for the premium representation. In this invention, the objective video quality metric Video Multimethod Assessment Fusion (VMAF) is considered (as defined in document Zhi Li et al (2016), "*Toward A Practical Perceptual Video Quality Metric*", Netflix TechBlog, June 6), but can be replaced by another objective video quality metric, such as peak signal-to-noise ratio (PSNR) or Multiscale structural similarity index measure (MS-SSIM) (as defined in document Wang, Z.; Simoncelli, E. P.; Bovik, A. C (2004), "*Multiscale structural similarity for image quality assessment*", ACSSC Conference), if it is considered as more relevant.

In the process for estimating the information representative of an energy consumption and of a video quality of FIG. 8, it is considered that the inputs of this process are:

the input video chunks to be analyzed by the process, before the encoding of these video chunks; the chunks are analyzed one-by-one;

a video information database, containing for different chunks of a pre-defined video database containing a large number M of video chunks ci, i=1 . . . M (of for example "64" or "100" frames, and of spatial resolution 4K and HD) the following data:

for each chunk ci, i=1 . . . M, features vectors Vi describing the chunk ci, i=1 . . . M. The features can be the Spatial Information (SI) and Temporal Information (TI) values as defined and described in document ITU-T P.910 "Subjective video quality assessment methods for multimedia applications": Vi={SIi, TIi}. Other features can be also considered, such as an average luminance of the pictures avglumi, a peak luminance of the pictures peaklumi, variance of the pictures of the chunk vari, motion vectors average amplitude (supposing a motion estimation is performed), amplitude of wavelet coefficients for different frequency bands, etc.

for each chunk ci, i=1 . . . M, a set of bitrates Bij(resol), j=1 . . . K, and quality metrics (e.g. PSNRij(resol), MS-SSIMij(resol), VMAFij(resol)) resulting from the encoding (possibly done off-line) of these chunks, for instance using different quantization parameters (QPs). The parameter resol indicates a resolution of the chunk, that is, resol=4K or resol=HD. The encoding can be done using a VVC encoder such as the VVC reference encoder named VTM, and using as different QPs the values {26, 30, 34, 38, 42, 47}. Encoding time ETij(resol) and decoding time DTij(resol) can also be collected. Other codecs can also be considered depending on the application, such as AVC, AV1, HEVC, VP9, etc.

The process for estimating the information representative of energy consumption and of video quality of FIG. 8 relies on an example of energy consumption model explained below. The energy $E_{tot}(B, ET, DT, peak_{lum}, avg_{lum})$ (or in a simplified version, $E_{tot}(B, ET, DT, peak_{lum})$) consumed in the streaming multimedia chain is estimated from the energy for encoding $E_{enc}$, the energy for distributing $E_{distrib}$, the energy for decoding $E_{dec}$ and the energy for displaying $E_{display}$ using the following model:

$$E_{tot}=E_{enc}+E_{distrib}+E_{dec}+E_{display}$$

where $$E_{enc}=C_{enc}+R_{enc}*B/\text{nbUsers};$$

$$E_{dec}=C_{dec}+R_{dec}*B;$$

$$E_{distrib}=C_{distrib}+R_{distrib}*B;$$

$$E_{display}=C_{display}+R_{display}*peak_{lum}(\text{or } avg_{lum}, \text{ or mix of both}).$$

$avg_{lum}$ is an average luminance of the pictures of the chunk, and $peak_{lum}$ is a peak luminance of the pictures of the chunk, $avg_{lum}$ and $peak_{lum}$ being expressed in nits (i.e. in $cd/m^2$ or candela per $m^2$). nbUsers corresponds to a number of end-users consuming the video chunk. In off-line streaming applications, it is considered as a large value since a content, once encoded off-line, will be consumed by multiple users (for instance "100000" users). $C_{enc}$, $R_{enc}$, $C_{distrib}$, $R_{distrib}$, $C_{dec}$, $R_{dec}$, are pre-defined parameters representative of the model of energy estimation for the encoding, distribution and decoding. $C_{display}$, $R_{display}$ are pre-defined parameters representative of the model of energy estimation for the display. Possible values, based on literature, considering bitrates are expressed in kbps, are the following: $C_{enc}=0$ W/kbps, $R_{enc}\approx0.2$ W/kbps, $C_{distrib}=0$ W/kbps, $R_{distrib}\approx0.02$ W/kbps, $C_{dec}=0$ W/kbps, $R_{dec}\approx0.0005$ W/kbps. Possible values, based on literature, considering peak luminance expressed in nits or cd/m2, are the following: $C_{display}\approx15\text{-}20$ W (basic display consumption when displaying black pictures), $R_{display}\approx0.5$ W/nits.

For example, these last models could be based on several studies showing that:

according to the document "*Greening Video Distribution Networks, 2018*", it can be approximated that encoding of one hour of video (around 1 GB data in 2013) leads to around 400 Wh. 1 GB per hour corresponds to bitrate=2222 kbps. So $R_{enc}=400/2222\sim0.2$ W/kbps.

In 2019, a video on demand application typically consumed around 0.077 kWh (77 Wh) of electricity per hour. If we consider that in 2019 average bitrate was around 4000 kbps, this leads to $R_{distrib}$=0.02 W/kbps.

according to the document JVET-P0084 "*Decoding Energy Assessment of VTM*-6.0, 2019", in a worst case of software decoding using a non-optimal implementation of VVC, $R_{dec}$=0.5 W/Mbps=0.0005 W/kbps. More realistic implementations should lead to much lower values (divided by "3"). For hardware implementations this should be even lower. We can consider $C_{dec}$ and $R_{dec}$ almost close to zero.

according to the document "Scholand et al, *Measurement of automatic brightness control in televisions—critical for effective policy-making,* 2017", $R_{display}$ could be from "0.3" to "0.6" W/nits.

Other models can also be considered, in particular, $E_{enc}$ and $E_{dec}$ can also rely on the encoding and decoding times ET and DT. For example $$E_{enc}=C'_{enc}+R'_{enc}*ET/\text{nbUsers};$$

$$E_{dec}=C'_{dec}+R'_{dec}*DT.$$

where $C'_{enc}$, $R'_{enc}$, $C'_{dec}$, $R'_{dec}$ are values that depend on the encoder and decoder implementations.

In the following the energy related to display/rendering (i.e. $R_{display}$), which is not dependent on the bitrate and resolution of the distributed content (supposed to be displayed at the resolution of the display, whatever the resolution of the distributed content is), is not considered.

FIG. 8 illustrates an example of process for estimating the information representative of an energy consumption and of a video quality. The process of FIG. 8 consists in choosing for the "green" representation, the resolution among 4K and HD offering the best quality. The quality is no more assessed based on the VMAF quality metric but on the MS-SSIM quality metric. Indeed, it is known that VMAF is well adapted to full resolution but may fail when there is a resampling, which is typically the case when various representations of a same video are generated by a headend, a CDN or a transcoder. MS-SSIM is known to be more robust to resampling.

In the example of FIG. 8, the process is performed by the processing module 400 of headend 2 as a pre-processing step before the encoding process, or right after the encoding process.

In a step 800, the features vector $V_{chunk}$ is computed by the processing module 400 for a current chunk. Each feature is computed from the pictures of the chunk. For instance, $V_{chunk}$ consists of the features made of SI and TI values of the chunk: $V_{chunk}=\{SI_{chunk}, TI_{chunk}\}$. $SI_{chunk}$, $TI_{chunk}$ are computed according the estimation process of SI and TI as described in the document ITU-T P.910 "Subjective video quality assessment methods for multimedia applications".

In a step 801, the chunks from the video information database which have $V_i=\{SI_i, TI_i\}$ the closest to $V_{chunk}$ are identified by the processing module 400. In a simple version, only the chunk ci from the video information database with $V_i=\{SI_i, TI_i\}$ the closest to $V_{chunk}$ is identified. Distance between vectors $V_{chunk}$ and $V_i$ is noted $d_i$.

In a step 802, for each chunk ci of the chunks selected in step 801, the bitrate at 4K resolution, $B_{premium}(ci)$, corresponding to a quality metric VMAF equal to VMAFmax is determined by the processing module 400 based on the various bitrates and VMAF values of the chunks stored in the video information database.

the quality metric at 4K resolution $MS\text{-}SSIM_{premium}(ci)$ corresponding to bitrate $B_{premium}(ci)$ is also derived by the processing module 400.

Average bitrate at 4K resolution $B_{premium}$ is then computed by the processing module 400 as a weighted average of the bitrates $B_{premium}(ci)$ for the premium representation, ci representing the plurality of chunks selected in step 801. Average $MS\text{-}SSIM_{premium}$ at 4K resolution is also computed by the processing module 400 as a weighted average of the quality metrics $MS\text{-}SSIM_{premium}(ci)$ for the premium representation, ci being the plurality of chunks selected in step 801. The weight for each selected chunk ci is, for example, based on the distance $d_i$. For instance, the weight for each selected chunk ci is set equal to $1/(a+d_i)$ with a being a pre-defined offset value (e.g. a=0.01).

The computation can also be made for other parameters such as $ET_{premium}$, $DT_{premium}$ and $peaklum_{premium}$ when they are used in the estimation model of the consumed energy.

Average bitrates Bj(resol), MS-SSIMj(resol), encoding time ETj(resol), decoding time DTj(resol), peaklumj(resol), for j=1 . . . K, and for resol=4K and HD, are also computed by the processing module 400 as a weighted average of the bitrates $B_{ij}$(resol), MS-SSIMij(resol), ETij(resol), DTij (resol) of chunk ci, ci representing the plurality of chunks selected in step 801. Energy Ej(resol), for j=1 . . . K, and for resol=4K and HD, is then computed from Bj(resol), MS-SSIMj(resol), encoding time ETj(resol), decoding time DTj (resol).

$$Ej(resol)=E_{tot}(Bj(resol), ETj(resol), DTj(resol), \text{peak-}lumj(resol))$$

In step 803, the energy of the premium representation is derived by the processing module 400 from the premium parameters computed in step 802:

$$E_{premium}=E_{tot}(B_{premium}, ET_{premium}, DT_{premium}, \text{peak-}lum_{premium})$$

The energy of the green representation $E_{green}$ is derived by the processing module 400 from the energy of the premium representation $E_{premium}$ as $$E_{green}=(r_{energy}*E_{premium})$$

In a step 804, the value $MS\text{-}SSIM_{4K}$ corresponding to the energy of the green representation $E_{green}$ is computed by the processing module 400, based on an approximation function msssim4K(·) defined such that MS-SSIMj(4K)=msssim4K (E'j(4K)) for j=1 . . . K. For instance msssim4K(·) is a piece-wise linear function defined by the pivot points (Ej (4K), MS-SSIMj(4K)).

$$MS\text{-}SSIM_{4K}=msssim4K(E_{green})$$

In this step, from the energy of the green representation $E_{green}$, the processing module 400 determines an energy/distortion point in the database leading to an energy equal to $E_{green}$ for a 4K representation.

In a step 805, the value $MS\text{-}SSIM_{HD}$ corresponding to the energy of the green representation $E_{green}$ is computed by the processing module 400, based on an approximation function msssimHD(·) defined such that MS-SSIMj(HD)=msssimHD (Ej(HD)) for j=1 . . . K. For instance msssimHD (·) is a piece-wise linear function defined by the pivot points (Ej (HD), MS-SSIMj(HD)).

$$MS\text{-}SSIM_{HD}=msssimHD(E_{green})$$

In this step, from the energy of the green representation $E_{green}$, the processing module 400 determines an energy/distortion point in the database leading to an energy equal to $E_{green}$ for a HD representation.

In a step 806, the processing module 400 selects between the 4K or HD representation based on the energy MS-SSIM values. If MS-SSIM$_{HD}$ is higher than MS-SSIM$_{4K}$ then HD resolution is selected, otherwise 4K resolution is selected. In step 806, the processing module 400 selects the representation among 4K and HD leading to the best value of the MS-SSIM metric for the Green representation.

In step 807, the processing module 400 inserts the following information related to the premium and green representations in a manifest file or in an SEI message:

premium resolution (4K);

Estimated premium bitrate;

Estimated premium VMAF and MS-SSIM;

Estimated premium energy consumption.

Selected green resolution (between 4K and HD);

Estimated green bitrate;

Estimated green VMAF and MS-SSIM;

Estimated green energy consumption.

In a variant, the estimated green energy consumption is not provided directly but replaced by a ratio $r_{energy}$ between the Estimated green energy consumption and Estimated green energy consumption: $r_{energy}$=Estimated green energy consumption/Estimated premium energy consumption.

In another variant, only the Estimated premium energy consumption is provided in the SEI message or the manifest file. In this variant, the ratio $r_{energy}$ is known by the end device.

In another variant, only the ratio $r_{energy}$ is provided in the SEI message or the manifest file. It is supposed in this variant that the end device doesn't need to know the absolute values of the estimated energy consumption but only the gain in terms of energy consumption reduction it will obtain by requesting the green representation instead of the premium representation.

In another variant, only the Estimated premium and green VMAF values are provided in the SEI message or the manifest file.

In another variant, only the Estimated premium and green MS-SSIM values are provided in the SEI message or the manifest file.

In another variant, the Estimated premium and green PSNR values are provided in the SEI message or the manifest file.

In another variant, the Estimated premium and green Mean Opinion Scores (MOS), as defined in ITU-T Rec. P.10 (2006) Vocabulary for performance and quality of service, are provided in the SEI message or the manifest file. MOS for each chunk, for each considered bitrate, for each considered resolution, of the video database, can be obtained from visual tests achieved offline, comparing the source (not compressed) chunk and the decoded chunk, possibly resampled when it is not at native resolution.

This information is then used by the end device 61. As can be seen, in the embodiment based on the process of FIG. 8, the end device receives, for a reference representation of a content (here the premium representation) and for at least one additional representation of the content (here the green representation), a message comprising information representative of an energy consumed by at least one node of the multimedia streaming system for applying at least one process on the representation prior to delivering the representation to the end device 61 and information representative of a quality of the representation.

An example of application of the embodiment based on the process of FIG. 8 in the context of FIG. 3 comprises the steps:

In step 300, the processing module 400 to the source 1 generates an original bitstream from a multimedia content.

Step 301 and 302 are skipped since the source 1 doesn't generate an SEI message nor a manifest file.

In step 303, the processing module 400 of the source 1 transmits the original bitstream to the headend 2.

In step 304, the processing module 400 of the headend 2 receives the original bitstream and generates the bitstreams corresponding to a plurality of profiles (i.e. the premium representation and the green representation).

In a step 305, the processing module 400 of the headend 2 applies the process of FIG. 8 and inserts the information related to the premium and green representations in a manifest file.

Step 306 is skipped.

In step 307, the processing module 400 of the headend 2 transmits the bitstreams to the server 3 in the form of chunks along with the manifest file.

The processing module 400 of the server 3 receives the chunks and the manifest file in the step 308 and transmits these chunks and the associated manifest file to the CDN 41 in the step 310. Step 309 is skipped.

In step 311, the CDN 41 receives and stores the chunks and the associated manifest file.

Step 312 is skipped.

In step 350, the processing module 400 of the end device 61 sends a first request to the CDN 41 via the network 5 to obtain the manifest file.

Upon reception of this first request, the processing module 400 of the CDN 41 transmits the manifest file to the end device 61 via the network 5 in step 351.

In an embodiment of step 353, upon reception of the manifest file in step 352, the processing module 400 of the end device 61 displays to the user:

an information representative of the resolution of the reference representation (here the resolution of the premium representation);

an information representative of the bitrate of the reference representation (here the bitrate of the premium representation);

an information representative of the VMAF and MS-SSIM of the reference representation (here the VMAF and MS-SSIM of the premium representation);

an information representative of the energy consumption induced by the delivery of the reference representation (i.e. the premium energy consumption);

and for each additional representation:

an information representative of the resolution of the additional representation (here the resolution of the green representation);

an information representative of the bitrate of the additional representation (here the bitrate of the green representation);

an information representative of the VMAF and MS-SSIM of the additional representation (here the VMAF and MS-SSIM of the green representation);

and an information representative of the energy consumption induced by the delivery of the additional representation (i.e. the green energy consumption);

In step 353, the user selects the representation it prefers among the reference representation (i.e. the premium representation) and the at least one additional representation (i.e. the green representation) based on the displayed information.

Upon reception of the information representative of the selected representation, in step 356, the processing module

400 transmits the chunks corresponding to the requested representation to the end device 61. Steps 353, 354, 355, 358 and 359 are skipped.

Until now, in the embodiment related to the process of FIG. 8, the SEI message or the manifest file is generated by one node of the multimedia streaming chain. In particular, we described an embodiment wherein the SEI message or the manifest file are generated by the processing module of the headend 2. In a variant, a first version of the SEI message (respectively the manifest file) is generated by the headend 2 and then complemented by another node such as a CDN or a transcoder of the multimedia streaming chain. Indeed, as already described, a CDN (or a transcoder) can generates additional representations of a content from the representations generated by the head-end 2. In that case, the CDN (or the transcoder) applies the process of FIG. 8 when generating the additional representations to update the SEI message (respectively the manifest file).

We described above a number of embodiments. Features of these embodiments can be provided alone or in any combination. Further, embodiments can include one or more of the following features, devices, or aspects, alone or in any combination, across various claim categories and types:

A bitstream or signal that includes one or more of the described syntax elements, or variations thereof Creating and/or transmitting and/or receiving and/or decoding a bitstream or signal that includes one or more of the described syntax elements, or variations thereof.

A Source, headend, server, CDN, TV, set-top box, cell phone, tablet, or other electronic device that performs at least a part of one of the embodiments described.

A Source, headend, server, CDN, TV, set-top box, cell phone, tablet, or other electronic device that performs at least one of the embodiments described, and that plays (e.g. using a monitor, screen, audio devices or other type of rendering devices) a resulting multimedia content.

A Source, headend, server, CDN, TV, set-top box, cell phone, tablet, or other electronic device that tunes (e.g. using a tuner) a channel to receive a signal including a streamed multimedia content, and performs at least a part of one of the embodiments described.

A Source, headend, server, CDN, TV, set-top box, cell phone, tablet, or other electronic device that receives (e.g. using an antenna) a signal over the air that includes an streamed multimedia content, and performs at least a part of one of the embodiments described.

The invention claimed is:

1. A method of controlling energy actually consumed by a multimedia streaming application for streaming data executed in a multimedia streaming system, the method comprising:

determining, at an intermediate node of the multimedia streaming system, a first energy actually consumed by the intermediate node when applying at least one first process on the data;

receiving, at the intermediate node, a message generated by a source node, different from the intermediate node, intended to transport information representative of the energy actually consumed by the multimedia streaming application to an end-user device different from the intermediate node;

inserting, at the intermediate node, into the message an information representative of the first energy; and controlling at least one characteristic of the streaming of the data, thereby modifying the energy actually consumed by the multimedia streaming application, based at least on the information representative of the first energy inserted into the message;

wherein the information representative of the first energy further comprises a first syntax element specifying that the type of the streaming is a one-to-many streaming, and a second syntax element specifying a number of next nodes to which the data is distributed by the intermediate node.

2. The method of claim 1, further comprising transmitting the message to at least one next node of the system involved in the multimedia streaming application.

3. The method of claim 1, wherein the message is received from a prior node of the multimedia streaming system involved in the multimedia streaming application and different from the source node, and wherein the message comprises information representative of a second energy actually consumed by the prior node when applying at least one second process on the data.

4. The method of claim 1, wherein the data is any of (i) an original bitstream representative of a multimedia content, (ii) at least one bitstream representative of a profile of the multimedia content obtained from the original bitstream, or (iii) at least one bitstream representative of a profile of the multimedia content obtained from the multimedia content.

5. The method of claim 4, wherein the at least one first process comprises one or more of:

receiving the original bitstream or the at least one bitstream from a prior node;

distributing the at least one bitstream to at least one next node;

transcoding the original bitstream into the at least one bitstream;

decoding the original bitstream and encoding the decoded original bitstream in the at least one bitstream; or multiplexing the at least one bitstream and/or routing the at least one bitstream.

6. The method of claim 1, wherein the information representative of the first energy further comprises at least one third syntax element, and wherein each third syntax element of the at least one third syntax element specifies a type of process applied by the intermediate node.

7. The method of claim 1, wherein the message is a first message, and wherein the intermediate node estimates an energy actually consumed by a preceding intermediate node different from the source node unable to manage a message intended to transport information representative of the energy actually consumed by the multimedia streaming application and inserts an information representative of the estimated energy in the first message.

8. A method of controlling an energy actually consumed by a multimedia streaming application executed in a multimedia streaming system, the method comprising, when executed in a node of the system, receiving data representative of a multimedia content, receiving a message generated by the method according to claim 3, and, modifying a characteristic of the data representative of the multimedia content involved in the energy actually consumed by the multimedia streaming system in function of information contained in the message.

9. A non-transitory information storage medium storing program code instructions for implementing the method according to claim 3.

10. An intermediate node of a multimedia streaming system executing a multimedia streaming application for streaming data, the node comprising electronic circuitry configured for:

determining, at the intermediate node of the multimedia streaming system, a first energy actually consumed by the intermediate node when applying at least one first process on the data;

receiving, at the intermediate node, a message generated by a source node, different from the intermediate node, intended to transport information representative of the energy actually consumed by the multimedia streaming application to an end-user device different from the intermediate node;

inserting, at the intermediate node, into the message an information representative of the first energy; and controlling at least one characteristic of the streaming of the data, thereby modifying the energy actually consumed by the multimedia streaming application, based at least on the information representative of the first energy inserted into the message;

wherein the information representative of the first energy further comprises a first syntax element specifying that the type of the streaming is a one-to-many streaming, and a second syntax element specifying a number of next nodes to which the data is distributed by the intermediate node.

11. The intermediate node of claim 10, wherein the electronic circuitry is further configured for transmitting the message to at least one next node of the multimedia streaming system involved in the multimedia streaming application.

12. The intermediate node of claim 10, wherein the message is received from a prior node of the multimedia streaming system involved in the multimedia streaming application and different from the source node, and wherein the message comprises information representative of a second energy actually consumed by the prior node when applying at least one second process on the data.

13. The intermediate node of claim 10, wherein the data is any of an original bitstream representative of a multimedia content, at least one bitstream representative of a profile of the multimedia content obtained from the original bitstream, or at least one bitstream representative of a profile of the multimedia content obtained from the multimedia content.

14. The intermediate node of claim 13, wherein the at least one first process comprises one or more of:

receiving the original bitstream or the at least one bit-stream from a prior node;

distributing the at least one bitstream to at least one next node;

transcoding the original bitstream into the at least one bitstream;

decoding the original bitstream and encoding the decoded original bitstream in the at least one bitstream; or multiplexing the at least one bitstream and/or routing the at least one bitstream.

15. The intermediate node of claim 10, wherein the information representative of the first energy further comprises at least one third syntax element, and wherein each third syntax element of the at least one third syntax element specifies a type of process applied by the intermediate node.

16. The intermediate node of claim 10, wherein the message is a first message, and wherein the intermediate node estimates an energy actually consumed by a preceding intermediate node different from the source node unable to manage a message intended to transport information representative of the energy actually consumed by the multimedia streaming application and inserts an information representative of the estimated energy in the first message.

* * * * *